US011126787B2

(12) United States Patent
Olivier et al.

(10) Patent No.: US 11,126,787 B2
(45) Date of Patent: Sep. 21, 2021

(54) GENERATING RESPONSIVE CONTENT FROM AN ELECTRONIC DOCUMENT

(71) Applicant: MadCap Software, Inc., San Diego, CA (US)

(72) Inventors: Anthony Olivier, Carlsbad, CA (US);
Vincent Denosta, San Diego, CA (US);
Francis Novak, San Diego, CA (US);
Richard Martin, San Diego, CA (US)

(73) Assignee: MADCAP SOFTWARE, INC., San Diego, CA (US)

( * ) Notice: Subject to any disclaimer, the term of this patent is extended or adjusted under 35 U.S.C. 154(b) by 0 days.

(21) Appl. No.: 16/788,109

(22) Filed: Feb. 11, 2020

(65) Prior Publication Data
US 2021/0248304 A1    Aug. 12, 2021

(51) Int. Cl.
*G06F 17/00* (2019.01)
*G06F 40/106* (2020.01)
*G06F 16/14* (2019.01)
*G06F 16/432* (2019.01)
*G06F 3/0484* (2013.01)
*G06F 40/143* (2020.01)
(Continued)

(52) U.S. Cl.
CPC ........ *G06F 40/106* (2020.01); *G06F 3/04842* (2013.01); *G06F 16/148* (2019.01); *G06F 16/432* (2019.01); *G06F 40/117* (2020.01); *G06F 40/143* (2020.01); *G06F 40/166* (2020.01); *G06F 2203/04803* (2013.01)

(58) Field of Classification Search
None
See application file for complete search history.

(56) References Cited

U.S. PATENT DOCUMENTS

| 7,934,153 B2 * | 4/2011 | Backlund | G06F 40/143 715/234 |
| 8,775,926 B2 * | 7/2014 | Viet | G06F 40/154 715/236 |

(Continued)

OTHER PUBLICATIONS

"Adobe® Dreamweaver® Help", dated: Nov. 7, 2019, total pp. 721. URL:<https://helpx.adobe.com/pdf/dreamweaver_reference.pdf>(Year: 2019).*

(Continued)

*Primary Examiner* — Mustafa A Amin
(74) *Attorney, Agent, or Firm* — Procopio, Cory, Hargreaves & Savitch LLP

(57) ABSTRACT

Systems and methods are disclosed herein for disclosed for controlling the display of content in web-based documents based on a characteristic of a viewport used to render that content. For example, a method comprising storing a document as a data file comprising content data and storing control data as one or more control data files; applying tags to a portion of the content data according to user input; designating media query rules for each of the tags, each media query rule responsive to one or more viewport characteristics; and generating control data based, in part, on said designation, the control data comprising each of tags in association with the respectively designated media queries rules, wherein, when the output file is rendered, the at least a portion of the content data is displayed responsive to the media query rules corresponding thereto based on the tags.

24 Claims, 15 Drawing Sheets

(51) Int. Cl.
  *G06F 40/166* (2020.01)
  *G06F 40/117* (2020.01)

(56) References Cited

U.S. PATENT DOCUMENTS

| | | | | |
|---|---|---|---|---|
| 9,817,916 | B2* | 11/2017 | Flack | G06F 16/986 |
| 10,241,975 | B2* | 3/2019 | Elings | G06F 40/131 |
| 2003/0177441 | A1* | 9/2003 | Clarke | G06F 40/117 |
| | | | | 715/229 |
| 2005/0050000 | A1* | 3/2005 | Kwok | G06F 16/9577 |
| 2006/0230344 | A1* | 10/2006 | Jennings | G06F 16/957 |
| | | | | 715/201 |
| 2006/0236223 | A1* | 10/2006 | Aubert | G06F 16/9577 |
| | | | | 715/205 |
| 2007/0214237 | A1* | 9/2007 | Stibel | G06F 16/29 |
| | | | | 709/217 |
| 2008/0313659 | A1* | 12/2008 | Eide | G06F 40/154 |
| | | | | 719/328 |
| 2011/0099294 | A1* | 4/2011 | Kapur | H04L 67/02 |
| | | | | 709/246 |
| 2011/0099467 | A1* | 4/2011 | Kapur | H04L 67/02 |
| | | | | 715/236 |
| 2011/0137973 | A1* | 6/2011 | Wei | H04L 67/1008 |
| | | | | 709/202 |
| 2011/0258250 | A1* | 10/2011 | Cremin | H04L 67/02 |
| | | | | 709/203 |
| 2011/0314091 | A1* | 12/2011 | Podjarny | H04L 43/04 |
| | | | | 709/203 |
| 2012/0150993 | A1* | 6/2012 | Flack | H04W 4/18 |
| | | | | 709/217 |
| 2013/0033523 | A1* | 2/2013 | Stovicek | G06F 40/197 |
| | | | | 345/649 |
| 2013/0097487 | A1* | 4/2013 | Alli | G06F 40/154 |
| | | | | 715/239 |
| 2013/0219024 | A1* | 8/2013 | Flack | H04L 67/02 |
| | | | | 709/219 |
| 2013/0227078 | A1* | 8/2013 | Wei | H04L 67/2871 |
| | | | | 709/219 |
| 2016/0232151 | A1 | 8/2016 | Blackmon | |
| 2016/0342312 | A1 | 11/2016 | Jiang | |
| 2017/0032434 | A1 | 2/2017 | Ker et al. | |

OTHER PUBLICATIONS

"RH Adobe RoboHelp", dated: 2017, total pp. 20, URL<https://www.tutorialspoint.com/adobe_robohelp/adobe_robohelp_tutorial.pdf> (Year: 2017).*

"<oxygen/> for XML Development", pp. 1-2, URL<https://www.oxygenxml.com/doc/brochures/Datasheet_XML_Editor.pdf> (Year: 2021).* w3schools.com, HTML Responsive Web Design, https://www.w3schools.com/html/html_responsive.asp, Apr. 11, 2019, 16 pages.

https://www.webdesignersacadamey.com; Show and Hide Different Content on Mobile Devices & Desktops, Apr. 11, 2019, 41 pages.

* cited by examiner

```
<?xml version="1.0" encoding="utf-8"?>
<html xmlns:MadCap="http://www.madcapsoftware.com/Schemas/MadCap.xsd" MadCap:onlyLocalStyles="False" MadCap:searchable
="False" class="home-topic" style="mc-master-page:url('Resources/MasterPages/Home-Page.flmsp');">
    <head>
        <link href="" rel="stylesheet" type="text/css" />
    </head>
    <body class="home-topic">
        <div class="topic-hero">
            <h1>Welcome to Our Help Center</h1>
            <h2 class="whiteheader" MadCap:conditions="ResponsiveContent.Web-ResponsiveContent.Tablet">The Place to
Find Information, Tutorials, FAQs, and More</h2>
        </div>
        <h3 style="text-align:center;">
            <MadCap:conditionalText MadCap:conditions="ResponsiveContent.Web">Click</MadCap:conditionalText><MadCap:
conditionalText MadCap:conditions="ResponsiveContent.Tablet-ResponsiveContent.Mobile">Tap</MadCap:conditionalText>
on the options to learn more</h3>
        <div>
            <p class="options"><a href="#Latest"><img src="Resources/Images/hand.png" style="width: 35px;height: 35px;"
MadCap:conditions="ResponsiveContent.Tablet-ResponsiveContent.Mobile" />Latest Updates<img src="Resources/Images/
pointer.png" alt="" title="" style="width: 39px;height: 39px;"MadCap:conditions="ResponsiveContent.Web" /></a>
            </p>
            <div>
            <p class="options"><a href="#Frequent"><img src="Resources/Images/hand.png" style="width: 34px;height: 34px;"
MadCap:conditions="ResponsiveContent.Tablet-ResponsiveContent.Mobile" />FAQs<img src="Resources/Images/
pointer.png" alt="" title="" style="width: 39px;height: 39px;"MadCap:conditions="ResponsiveContent.Web" /></a>
            </p>
            <div>
            <p class="options"><a href="#Quick"><img src="Resources/Images/hand.png" style="width: 35px;height: 35px;"
MadCap:conditions="ResponsiveContent.Tablet-ResponsiveContent.Mobile" />Quick Links<img src="Resources/Images/
pointer.png" alt="" title="" style="width: 39px;height: 39px;"MadCap:conditions="ResponsiveContent.Web" /></a>
            </p>
            </div>
        </div>
        <div class="home-layout">
            <div class="home-selection">
                <div class="home-titles">
                    <div> <img src="home-tiles-layout">
                    </div>
                    <div>
```

```
<?xml version="1.0" encoding="utf-8"?>
<CatapultTarget
    Version="2"
    Comment="MadCap HTML5 Target"
    Type="WebHelp2"
    Destinations=""
    GlossaryTermConversion="marked"
    MasterPage="/Content/Resources/MasterPages/Other-Topics.flmsp"
    DefaultUrl="/Content/Home.htm"
    ShowMadCapBacklink="true"
    ConditionTagExpression="exclude[Default.PrintOnly], @media web[ResponsiveContent.Web],
@media tablet[ResponsiveContent.Tablet], @media mobile[ResponsiveContent.Mobile]"
    ResolveCssVariables="true"
    GenerateTOCProxy="true"
    GenerateIndexProxy="true"
    GenerateGlossaryProxy="true" />
</CatapultTarget>
```

GENERATING RESPONSIVE CONTENT FROM AN ELECTRONIC DOCUMENT

TECHNICAL FIELD

The present invention relates generally to representing and manipulating underlying content of a document, and, more specifically, to providing an integrated editor creating responsive content within a document that is displayable based on characteristics of the viewport.

BACKGROUND

Documents may generally be categorized as being either structured or unstructured. Unstructured documents represent content as a linear sequence of characters. These characters include the content as well as control characters that specify formatting information regarding the content. A structured project, in contrast, is not ordered as a linear representation but typically is organized as a tree structure or other type of directed acyclic graph. For example, a document may be represented as a tree with a node at the top having child nodes representing content groupings and the front and back portions of the content, which may include sections and paragraphs. These components are organized as a hierarchical tree. Each structured document may be specified in a structured document language, such as the extensible markup language (XML), the Standard Generalized Mark-up Language (SGML), hypertext markup language (HTM or HTML), Extensible HyperText Markup Language (XHTML), or any markup language known in the art, or may be specified according to a known standard, such as the Office Document Architecture (ODA) standard.

For users, editing of unstructured projects is fairly intuitive and straightforward. The user simply selects a portion of the project to be edited and then applies an editing operation to the selected portion. With structured documents, editing is not as straightforward. Structured document editors require that the user operate on the syntactic entities (e.g., section, paragraph, etc.) specified within the structured project. As a result, editing operations may be cumbersome. Accordingly, it may not be possible to edit a portion of the document, which spans the boundaries of syntactic entities, in a single operation.

Current editors for writing with markup languages, such as XHTML, HTML, XML and SGML, focus primarily on either structure (at the expense of content editing) or focus on content editing (and abstract away the underlying structure).

For example, Cascading Style Sheets (CSS) is a syntax language used for describing syntactic entities within the structured project, such as, the look and formatting of a document written in a markup language. CSS is designed to enable the separation of content from structure, including elements such as the layout, colors, and fonts. CSS makes it possible to separate instructions from the HTML content in a separate file or style section of the HTML file. For each matching HTML element, CSS provides a list of formatting instructions. For example, a CSS rule might specify that "all heading 1 elements should be bold," leaving pure semantic HTML markup that asserts "this text is a level 1 heading" without formatting code such as a <bold> tag indicating how such text should be displayed.

The separation of formatting and content makes it possible to present the same markup page in different styles for different rendering methods, such as on-screen rendering, in print, etc. It can also be used to display the web page differently depending on the rendering viewport size or device on which the document is being viewed. One such method is responsive web design (RWD), which is aimed at crafting sites to provide an optimal viewing experience—easy reading and navigation with a minimum of resizing, panning, and scrolling—across a wide range of devices (from desktop computer monitors to mobile phones). A site designed with RWD adapts the layout to the viewing environment by using fluid, proportion-based grids, flexible images, and CSS3 media queries, an extension of the @media rule. For example, media queries allow the page to use different CSS style rules based on characteristics of the display area used to render the document, which is most commonly the width of the browser or rendering viewport.

Current RWD methods focus on using media queries with the different style rules based on the characteristics of the rendering display. Thus, the content of the document is static across different display characteristics. Similarly, since media queries generally focus on styles, use of media queries is generally applied to blocks of syntax elements, restricting the granularity to which media queries are applicable. Additionally, current editors for writing with markup languages do not provide for a simple and intuitive approach for RWD, but instead require the author to know and use specific syntax and separately focus on editing the structure or on content.

The present disclosure is directed toward overcoming one or more of the problems discovered by the inventors.

SUMMARY

Accordingly, systems and methods are disclosed for controlling the display of content in web-based documents based on a characteristic of a viewport used to render that content. In one aspect, a system is disclosed that comprises at least one memory and at least one processor coupled to the at least one memory. The at least one memory is configured for storing a document as a data file comprising content data and storing control data for generating an output file as one or more control data files, and storing instructions. The at least one processor is configured to execute the instructions to apply one or more tags to at least a portion of the content data according to user input; designate one or more media queries for each of the one or more tags, each media query responsive to one or more viewport characteristic, and generate control data based, in part, on said designation, the control data comprising each of the one or more tags in association with the respectively designated one or more media queries. Where, when the output file is rendered on a viewport, the at least a portion of the content data is displayed responsive to the one or more media queries corresponding thereto based on the one or more tags.

In another aspect, a method is disclosed for controlling the display of content in web-based documents based on a characteristic of a viewport used to render that content. The method comprises generating first control data comprising at least a plurality of tags and storing the first control data in a first control data file; updating a content data file to include the plurality of tags in association with a portion of content data included in the content data file according to user input; generating a conditional expression designating one or more media queries for each of the plurality of tags; and updating a second control data file to include the conditional expression, the second control data file comprising second control data for generating an output file based on the content data file and a plurality of control data files including at least the first control data file and the second control data file, wherein when the output file is rendered by a computing device, the portion of the content data is displayed based on the computing device resolving the one or more media queries.

In another aspect, a method is disclosed for controlling the display of content in web-based documents based on a characteristic of a viewport used to render that content. The method comprises storing a document as a data file comprising content data and storing control data for generating an output file as one or more control data files; applying one or more tags to at least a portion of the content data according to user input; designating one or more media queries for each of the one or more tags, each media query responsive to one or more viewport characteristic; and generating control data based, in part, on said designation, the control data comprising each of the one or more tags in association with the respectively designated one or more media queries, wherein, when the output file is rendered on a viewport, the at least a portion of the content data is displayed responsive to the one or more media queries corresponding thereto based on the one or more tags.

BRIEF DESCRIPTION OF THE FIGURES

The details of embodiments of the present disclosure, both as to their structure and operation, may be gleaned in part by study of the accompanying drawings, in which like reference numerals refer to like parts, and in which:

FIG. 7 illustrates an example content data file generated by the data processing system shown in FIG. 2B.

FIG. 10 illustrates another example control data file generated by the data processing system shown in FIG. 2B.

DETAILED DESCRIPTION

Figure 1:
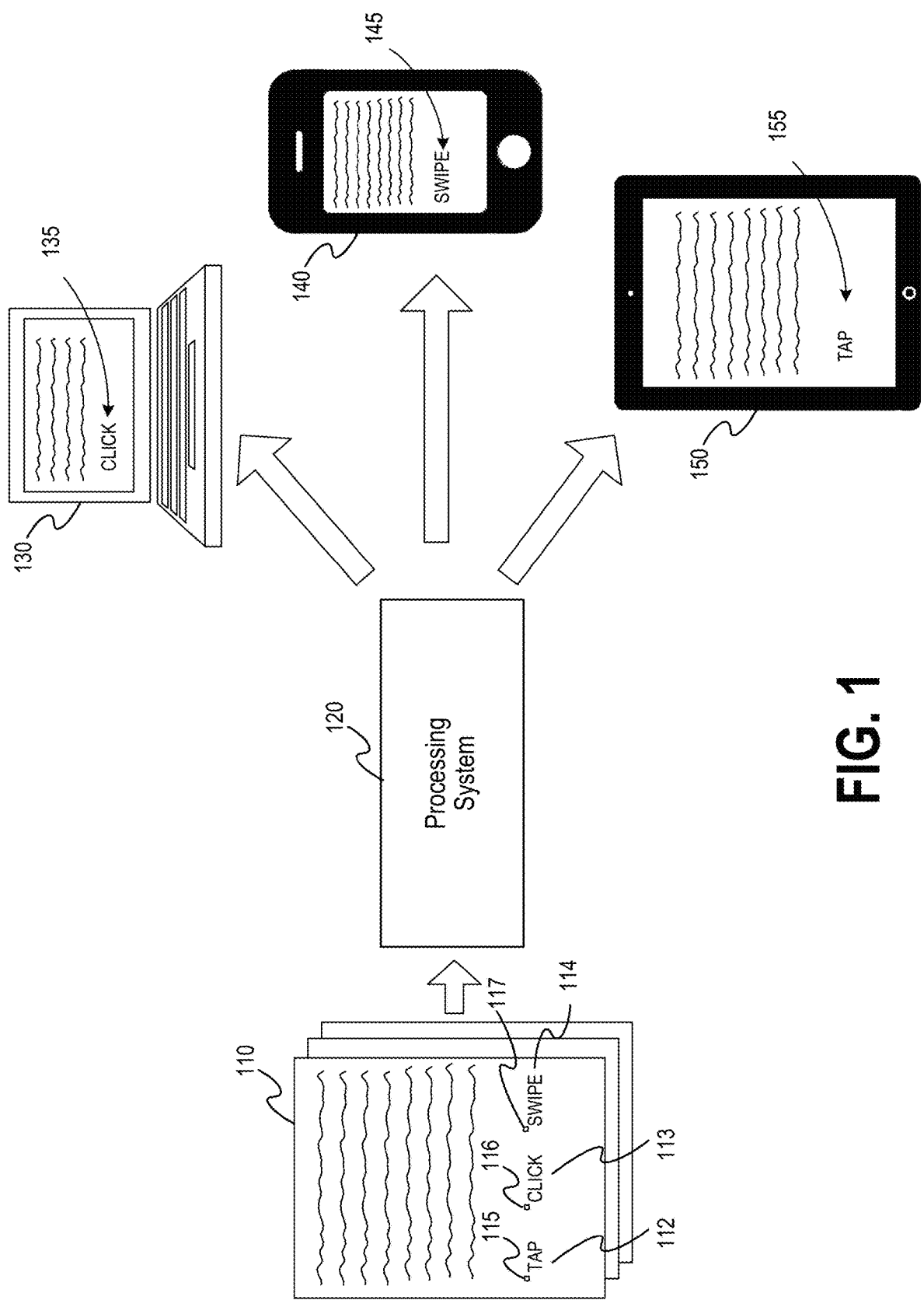
FIG. 1 is a schematic representation of an example data processing system utilized to create responsive content according to various embodiments.

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent that those skilled in the art will be able to understand the disclosure without these specific details. In some instances, well-known structures and components are shown in simplified form for brevity of description. Some of the surfaces have been left out or exaggerated for clarity and ease of explanation.

As used herein, viewport may refer to an area expressed in rendering-device-specific coordinates, e.g. pixels for screen coordinates, in which the content of interest are be rendered on a screen of a display system, for example, a user's visible area of a web page. The viewport may vary with the device (e.g., will be smaller on a mobile phone than on a computer screen), browser window that may be varied by a user, or any such area for such a display system renders content for consumption by a user.

Embodiments described herein generally relate to systems and methods for controlling the display of content in web-based documents based on a characteristic of a viewport used to render that content. For example, controlling content to be rendered based on the size of the viewport used to view the content. Thus, embodiments herein, provide systems and methods that facilitate creating and generating content that provides for an optimal viewing experience—easy reading and navigation with a minimum of resizing, panning, and scrolling—across a wide range of devices and viewport characteristics. As used herein, "characteristics" may refer to physical dimensions, such as but not limited to, height, width, size, or aspect ratios of a viewport; a resolution of the viewport, for example, in terms of pixel count; form factor, such as a type of displaying system or device; orientation of a viewport; etc.

More particularly, web pages can be designed in such a way that they "respond" to differences in form factors and aspect ratios of the viewport on which the content is displayed. For example, on a small mobile phone, certain content may be displayed that is more appropriate for viewport real estate utilization, while on a larger desktop device, there is less of a need to impose restrictions. Similarly, on a mobile phone or tablet, certain operation instructions (e.g., swipe or tap to navigate about the web pages) may be more appropriate for certain form factors, while on a desktop device other operation instructions (e.g., click using a mouse) may be more appropriate. Such web pages are commonly implemented using exclude/include instructions, for example, adaptive web design is used to generate static web pages for each form factor by excluding and including certain content. However, adaptive web design requires separately designing independent and distinct web pages for each form factor. Responsive web design commonly uses CSS media queries (sometimes referred herein as media query rules or conditions) to control different style sheets based on device form factor, but lack the control of the content itself. Other methods for responsive content have focused on creating divisions to define groups or blocks of content and then apply media queries to control each block. However, these methods require creating separate blocks of content for each form factor, and, where similar content is to be displayed on different form factors, creating duplicative blocks of content for each form factor. For example, if content is to be displayed on three form factors (e.g., a tablet, mobile phone, and desktop) and the tablet and mobile phone are to display similar content while the tablet and desktop display other similar content, then separate blocks of content for each form factor must be created and a media queries for each block separately applied. Such methods require the tedious process of duplicative authoring and editing, as well as debugging of the executable code.

The various embodiments provided herein provide systems and methods for intuitive and easy creation of responsive content by leveraging media queries in associations with user defined condition tags that can be applied to content elements of a graphically displayed document. As used herein, "tag", "tags", and "tagging" may refer to designating content and applying, for example, a characteristic, action or condition applied to that content based upon the designation. For example, as shown in FIG. 1, electronic authoring and publishing systems 120 provides for creation and editing of documents 110, content can be made responsive to a characteristics of a viewport used for rendering the document. Embodiments herein leverage a tagging protocol, whereby the author selects any granularity of content (e.g., content 112-114) and applies one or more condition tags (e.g., tags 115-117) to the selected content. Each condition tag may be associated with a rendering viewport characteristic, for example, by designating condition rules, such as media queries or rules, for each of the tags. The rendering viewport characteristic may be a computing device form factor (e.g., desktop computer or laptop 130, mobile phone 140, tablet 150, etc.) and/or a characteristic (e.g., size, resolution, or the like) of the computing device and/or Internet browser executed by the computing device. Embodiments herein may store the content with the applied condition tags as a first data file (sometimes referred to herein as a content data file), for example, by updating or otherwise populating the first data file with the conditions tags. Embodiments herein may also store the condition tags in association with the designated media query rule as a second data file (sometimes referred to herein as a control data file). The systems herein may then be executed to compile the data files and generate a published output file that comprises web-based content. When the output file is rendered on a computing device, the tagged content is displayed (e.g., content 135, 145, and 155) based on the media query rule for the condition tag applied to the content.

In various embodiments, the document 110 may be a single electronic document, for example, an XHTML document, documents generated by authoring tools or software packages (e.g., by word processing software packages, online authoring packages, etc.) or any electronic document. In various embodiments, the document may be included as part of an overall project that may arrange the contents thereof (e.g., content and control data) in a hierarchical arrangement (e.g., referred to herein as a "hierarchical project"). The electronic authoring and publishing systems 120 may generate an intuitive graphical user interface (GUI), as described below in greater detail, that provides the ability to manipulate and control content of the document 110, for example, providing an interface through which content can be selected and tagged as responsive content, as well as designating size conditions for each tag.

Content selected by the user and thus tagged may comprise any granularity of any type of content. For example, the selected content may be one or more characters of textual content, multimedia content, hyperlink content, executable operation content (e.g., click, swipe, tap operations), styles and formatting attributes associated with a given piece of content, table formats (e.g., rearrangement of rows and columns and/or any manipulation thereof), object arrangement, lists, dynamic expandable content (e.g., dropdowns, togglers, and expanding text), etc. One or more condition tags may also be applied to each portion of content, thus providing an ability to tag a single common content element or portion of content data for display based on designated media queries.

Figure 2A:
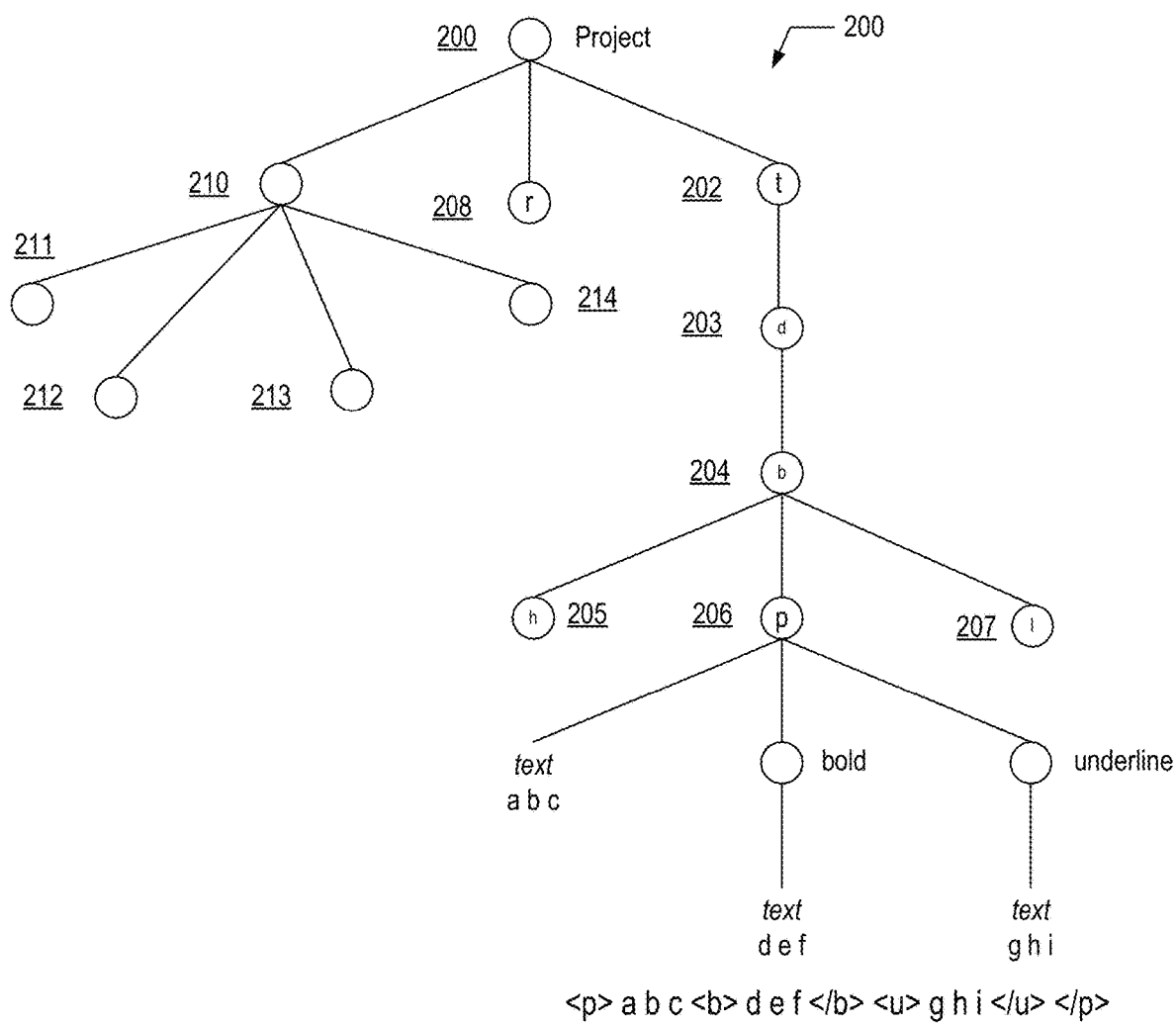
FIG. 2A is a graphical representation of a relatively simple hierarchical project represented in a tree format according to one embodiment.

FIG. 2A is a graphical representation of a relatively simple hierarchical project 200 made up of one or more content documents (e.g., document 110) and represented in a tree format having various abstraction levels. In the illustrated example, the hierarchical project 200 comprises project data that is a compilation of a plurality data files provided in executable code format (e.g., XHTML documents), which may be compiled to generate a single published output file (e.g., webpage, web-based content, other documents supporting responsiveness or text flowing based on viewport characteristics, or the like) for viewing by others. The project data of the hierarchical project 200 comprises one or more content documents that define the content of the hierarchical project 200, such as for example, documents in XHTML containing the underlying text and content of the hierarchical project (referred to herein as content data files). The hierarchical project 200 may also include control or structure information specifying style sheets, formatting, and other information that applies to the hierarchical project generally, such as for example, documents in XHTML containing information defining styles, structures, formats, conditions, etc. that are applicable to the content documents (referred to herein as control data files). In some embodiments, the hierarchical project 200 may be referred to as an unstructured project comprising a plurality of structured documents.

Hierarchical project 200 may be structured and otherwise organized into abstraction levels or files. Once such abstraction level may be topics, with each topic representative of a file comprising one or more documents related to the topic. In the illustrated example, the relatively simple hierarchical project 200 includes one topic 202, represented by 't', having one or more documents that each include content related to the topic 202. In the relatively simply hierarchical project, the topic 202 includes one document 203 (for example, document 110 described above) that may be a content data file, which may be provided in executable code format. However, the topic 202 may comprise any number of documents as desired. The document 203 includes a body 204, represented by 'b', having a heading 205 represented by 'h', a paragraph 206 represented by 'p', and/or executable reference 207 to images and/or multimedia content represented by 'i'. The document 203 may also include tables and other content. Images and multimedia content may be stored separate from the document 203 and retrieved by reference within the document 203, for example, executed in executable code format. In the illustrated example, the paragraph 206 includes plain text 'abc' followed by bold text 'def' followed by underlined text 'ghi'. The tree may be traversed in the order from top to bottom and left to right to translate the various content data files to be displayed. Therefore, hierarchical project 200 includes document 203 that would be displayed as 'abcdefghi' with any referenced image or multimedia items displayed adjacent to the text. The relatively simple hierarchical project 200 is for illustrative purposes only, and may include any number of topics 202, which each may include any number of documents 203. The body 204 of each document 203 may include a number of headings 205, paragraphs 206, and/or images or multimedia via reference 207. Additional resources 208 related to the content of the hierarchical project may also be included, for example, images and/or multimedia documents referenced in a document 203 (e.g., image files in any image format, such as but not limited to, JPEG, PNG, TIFF, GIF, etc.; video files formatted in any video format, such as but not limited to, MP4, 3GP, WMV, AVI, MPEG, etc.; audio files formatted in any image format, such as but not limited to, MP3, ACC, WMA, etc.), landing pages, page layouts, style sheets, and table styles.

The hierarchical project 200 may also include control information or data 210 containing instructions for generating a published output file including formatting parameters for the hierarchical project 200 for a given display environment. A display environment refers to a medium for which a user may view the hierarchical project once published. Example display environments may include, but are not limited to, a printed medium such as a PDF or the like, webpage or web-based publication for viewing via a network on a viewport of a personal computer or a mobile device, such as, a tablet, cellular telephone, wearable device (e.g., smart watches, etc.), augmented and/or virtual reality display device, and the like. Control information 210 may be a plurality of control data files, which may be provided in executable code format, such as for example, XHTML. In the illustrated example, the control information 210 may include, among other items, textual formatting criteria 211 (sometimes referred to as styles or style sheets), condition tags 213 (e.g., files defining tags that may be associated with content), skins 214 (e.g., files containing parameters, conditions, and criteria that define an appearance of the hierarchical project 200 upon publication), target environments 215 (e.g., files defining target display environments for publication), etc.

A target environment may be one instance of a published output file corresponding to a display environment defined in the data file. The target environment data file provides parameters for use by the compiling engine that takes the hierarchical project 200, and brings them together to produce an output file viewable using the corresponding display environment. That is, when the hierarchical project 200 is compiled, a given target may be selected from the target environments 215 and, using one or more of the control information 210, compile the document 203 in accordance with the selected target.

Figure 2B:
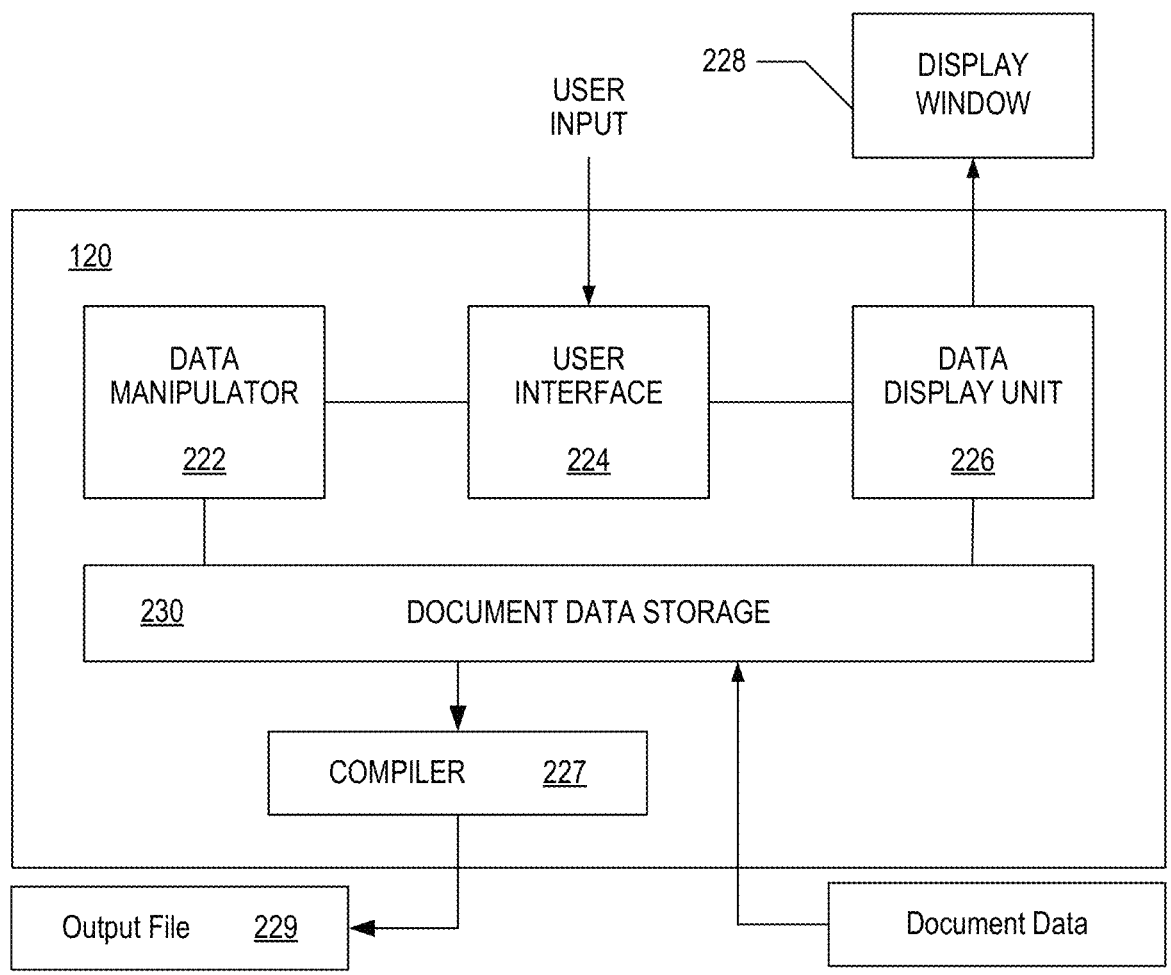
FIG. 2B is a block diagram of a data processing system which can process the hierarchical project shown in FIG. 2A.

FIG. 2B is a functional block diagram of the electronic authoring and publishing system 120 (sometimes referred to herein as data processing system or simply system) which can process a document such as the document 203 of the hierarchical project 200 shown in FIG. 2A. In the illustrated embodiment of FIG. 2B, the system 120 includes a data manipulator 222, a user interface 224, a data display unit 226, and compiler 227.

The user interface 224 receives input (e.g., keystrokes, touch screen, gestures, voice input, etc.) from an authoring user and sends the input either to the data display unit 226 to be processed and displayed and/or to the data manipulator 222 to manipulate the data. The user input can be a command, content (e.g., text), or other related input. The data manipulator 222 receives document data included as part of the project data, which may include text content, image data, multimedia data, document structure data, and other related data such as metadata, from a project data storage 230, and manipulates the received document data according to the user input. As used herein, "document data" refers to a single document included as part of the project data, which may be a content document (e.g., document 203) provided, for example, as content data and/or control information (e.g., control information 210) provided, for example, as a control data file. The manipulated document data is then stored in the project data storage 230. The data display unit 226 receives the user input from the user interface 224 and the document data from the project data storage 230, and processes the user input and the document data to generate a visual representation of the document data. The data display unit 226 ingests the document data and displays various components of the processed user input and the document data on a plurality of display panes 228 (collectively referred to herein as a "graphical user interface" or "GUI") in a manner which will be described in more detail below. The display panes 228 may include graphical visual representations of one or more panes for user interface, menus, icons, controls, tabs, etc., generated by the data display unit 226 and displayed on a display, such as a monitor, TV screen, display screen of a mobile device, display screen of a tablet or portable computing device, etc.

In an illustrative example, the user interface 224 may receive an input from the authoring user and send the input either to the data display unit 226 to be processed and displayed and/or to the data manipulator 222 to manipulate the data. For example, the data manipulator 222 may receive input to create one or more condition tags. The user interface 224 may then receive one or more inputs selecting one or more pieces of content and indicating one or more condition tags to associate with the selected content. The data manipulator 222 may then apply the one or more condition tags to the selected content, and the content containing the one or more tags may be stored in the project data storage 230, for example, as a content data file. The user interface 224 may then receive input designating conditions for each condition tag, and, based on the inputs, the data manipulator 222 generates an association between each tag and the designated condition. The associations are then stored in the data storage 230, for example, as a control data file. In some embodiments, the associations may be stored in a target environment data file. In some embodiments, the data manipulator 222 may apply one or more tags to selected content, for example, by receiving user input navigating to the selected portion and manipulating metadata to apply the condition tag to the selected portion of content within the content data file. The selected content may comprise any granularity of any type of content, for example, one or more characters of textual content, multimedia content, hyperlink content, executable operation content (e.g., click, swipe, tap operations), styles and formatting attributes associated with a given piece of content, table formats (e.g., rearrangement of rows and columns and/or any manipulation thereof), object arrangement, lists, dynamic expandable content (e.g., dropdowns, togglers, and expanding text), etc.

The data display unit 226 may receive the user input from the user interface 224 applying one or more condition tags to content, process the user input to associate the condition tag with selected content, and generate a visual representation of the condition tag displayed adjacent to or otherwise associated with the content based on proximity there between. The data display unit 226 displays various components of the processed user input and tagging protocol on one or more of the display panes 228 in a manner which will be described in more detail below.

Once a project is completed, the user interface 224 may receive the input from the user to compile the project data of the hierarchical project and generate a published output file 229. In various embodiments, the user may select a display environment for generating a published output file that defines a publication type (e.g., PDF, website, etc.) by selecting a target environment file. Based on the input, compiler 227 accesses the project data from project data storage 230 to compile the document data of the hierarchical project and build or generate the published output file 229, for example, an HTML5 output file that comprises a plurality of data files that define properties and content of the published project. For example, the compiler 227 may traverse the hierarchical project 200 based on a selected display environment and, in the order from top to bottom and left to right, translate the content data files (e.g., document 203) written in executable code format into an output that defines text displayed as 'abcdefghi' along with referenced image and/or multimedia items displayed adjacent to the text. The compiler 227 may traverse the content data files based in part on one or more of the control data files. For example, the compiler 227 may access one or more control data files (e.g., control information 210) based on references included in the content data files and apply the control information to the content to format and otherwise apply control conditions to hierarchical project 200. That is, the compiler 227 may receive project data from the project data storage 230 to build a published output file (e.g., an HTML5 output file) of the hierarchical project as defined by the content data files and control data files.

Published output file 229 may also include various data files that define background information and processes that need not be executed until a computer system (e.g., computer, tablet, cellular phone, etc.) executing the published output file ingests inputs corresponding to the background information. For example, the published output file 229 may comprise one or more portions of content associated with one or more condition tags. The published output file 229 may also include a conditional expression that associates the one or more condition tags with a viewport characteristic. The computer system may execute the published output file 229 to render the content contained in the output file 229 on a display of a computing device, for example, by an Internet browser executing the output file 229. As part of rendering the content, the computing device may generate content corresponding to each condition tag based on conditions associated with each tag.

For example, in various embodiments, each condition tag may be associated with a media query. A media query consists of a media type and one or more expressions, involving media features, which resolve to either true or false. The result of the query is true if the media type specified in the media query matches the type of device the document is being displayed on and all expressions in the media query are true. When a media query is true, the correspondingly tagged content is generated and the display. That is, the output file 229 queries the computing device or Internet browser using the media query rules associated with the tag corresponding to the content. Media query rules may be a collection of media queries providing conditions for acting on data associated with the media query, for example, a media query may be provided as @media.web which resolves as true if the computing device is a desktop computer or laptop; another media query may be provided as @media.tablet which resolves as true if the computing device is a tablet device; @media.mobile resolves as true if the computing device is a mobile telephone; @media.screen and (min-screen-width: XXXpx), where "XXX" is a number of pixels selected as a break point, resolves as true if the rendering viewport size has a width of XXX pixels or more. Other media queries are possible, for example, queries for wearable devices and various mobile devices, max device width, etc. By using defining break points using the max and/or min viewport width, content may be displayed based on the size of an Internet browser window, which may be adjusted by the third party viewing the content. The Internet browser executing the output file 229 may then ingest the results and solve the query to display corresponding content where the query is true or not display (e.g., hide) content if the query is false.

Figure 2C:
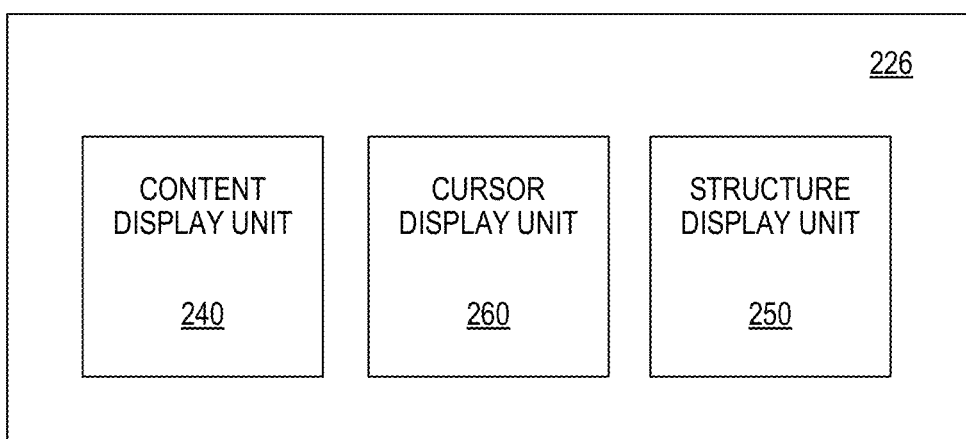
FIG. 2C is a detailed block diagram of a data display unit shown in FIG. 2B.

As illustrated in FIG. 2C, for example, the data display unit 226 includes a content display unit 240, a structure display unit 250, and a cursor display unit 260. In one embodiment, the content display unit 240 analyzes and displays the content of the document data; the structure display unit 250 analyzes and displays information representative of the structure of the document data; and the cursor display unit 260 displays the configuration of the cursor that indicates the current location of text content processing. In examples described below, the structure display unit 250 displays the different components (e.g., content data files and/or control data files) of the hierarchical project in separate areas of the display panes 228. The operation of the data processing system 120, and in particular, the operation of the data display unit 226 and its associated units with respect to the display panes 228, is described below in detail in connection with FIGS. 4A-10. Though the operation is described with reference to what is displayed to a user, it is to be understood that the display is generated by the units of the data processing system responding to user input and document data.

Figure 3:
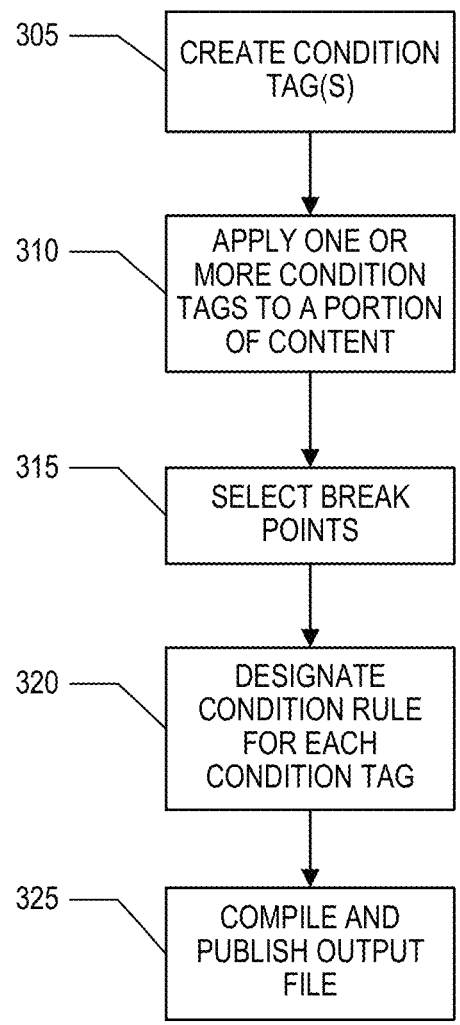
FIG. 3 is an example flow chart for creating responsive content according to various embodiments.

FIG. 3 is an example flowchart of a process 300 for creating responsive content in accordance with embodiments disclosed herein. The process 300 may be performed by the authoring and publishing system 120 discussed above to create responsive content from content of a hierarchical project, such as the hierarchical project 200 of FIG. 2A. In some embodiments, the process 300 may be performed by one or more computing devices such as example computing device 1105 of the example computing environment 1100 illustrated in FIGS. 11A and 11B discussed below.

Process 300 starts by opening an existing project or starting a new project. At block 305, a plurality of responsive content tags may be created and a data file corresponding thereto is generated. An example of creating responsive content tags using an embodiment of an authoring and publishing system is illustratively shown in FIGS. 4A-5. At block 310, one or more of the condition tags are applied to one or more portions of content of a document or portions of a project. In various embodiments, one or more condition tags may be applied to any desired portion of content. A plurality of condition tags may be applied to a common portion of content, such that the designated portion of content is associated with a plurality of tags. Any content may be designated, for example, one or more characters of textual content, multimedia content, hyperlink content, executable operation content (e.g., click, swipe, tap operations), styles and formatting attributes associated with a given piece of content, table formats (e.g., rearrangement of rows and columns and/or any manipulation thereof), object arrangement, lists, dynamic expandable content (e.g., dropdowns, togglers, and expanding text), etc. In response to applying the condition tags, a content data file for the content may be updated to include the one or more condition tags in association with the selected content, for example, wrapped around, adjacent to, or otherwise associated with the selected content. An example of applying condition tags using an embodiment of an authoring and publishing system is illustratively shown in FIGS. 6A-7. At block 315, one or more break points between conditions are defined and at block 320 a condition is designated for each condition tag, where the conditions are based in part on the break points. An example of defining break points and associating break points to responsive content tags using an embodiment of an authoring and publishing system is illustratively shown in FIGS. 8 and 9, respectively. At block 325, the document and/or hierarchical project can be compiled by traversing the data files based on the instructions to generate a published output file. When the output file is rendered on a computing device, the selected portion of the content is displayed when the rendering viewport characteristic of the device corresponds to the conditions designated for the one or more tags that are applied to the selected content.

Figure 4A:
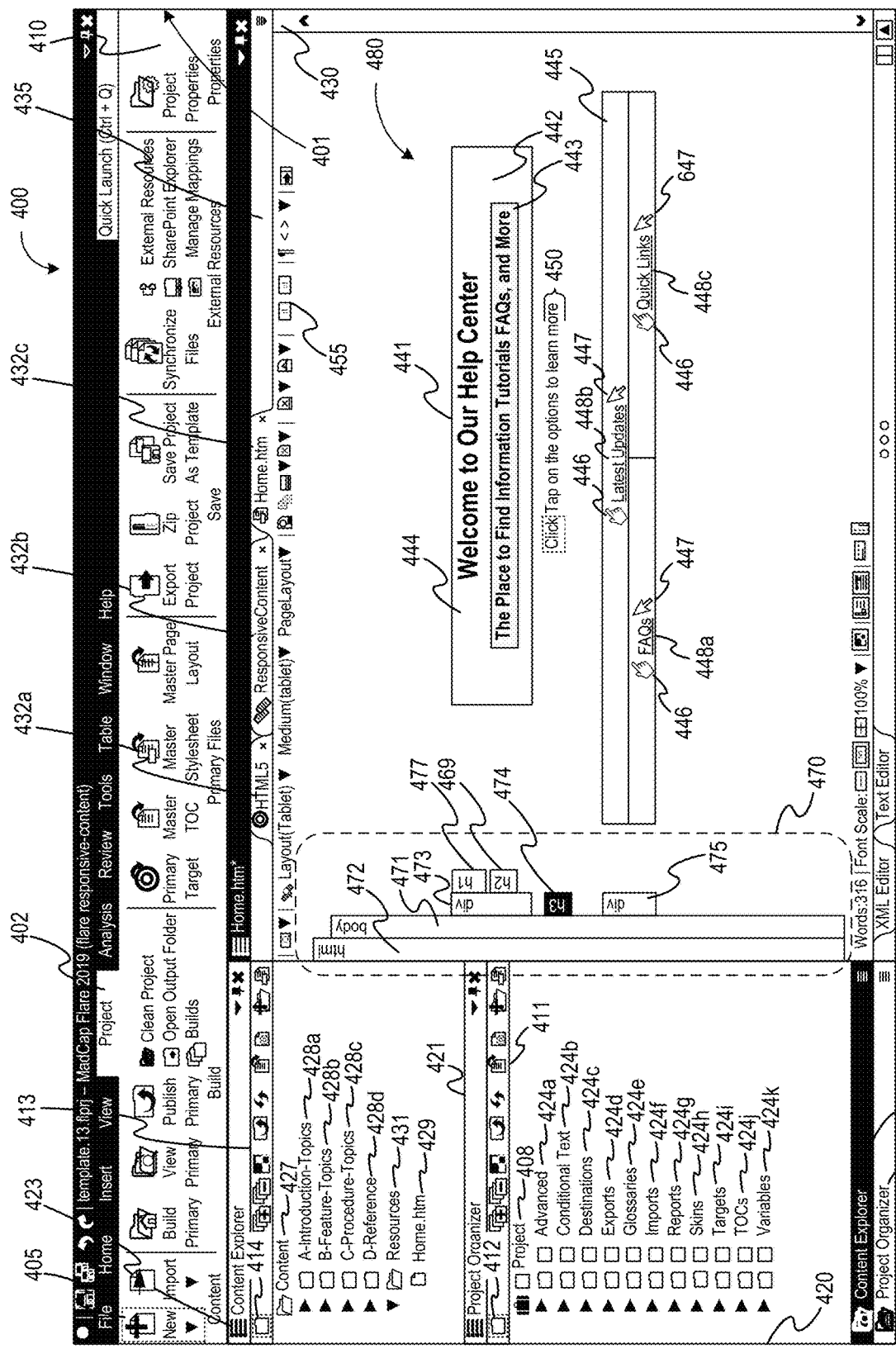
FIGS. 4A-4C illustrate an example graphical user interface for authoring the hierarchical project shown in FIG. 2A.
Figure 4B:
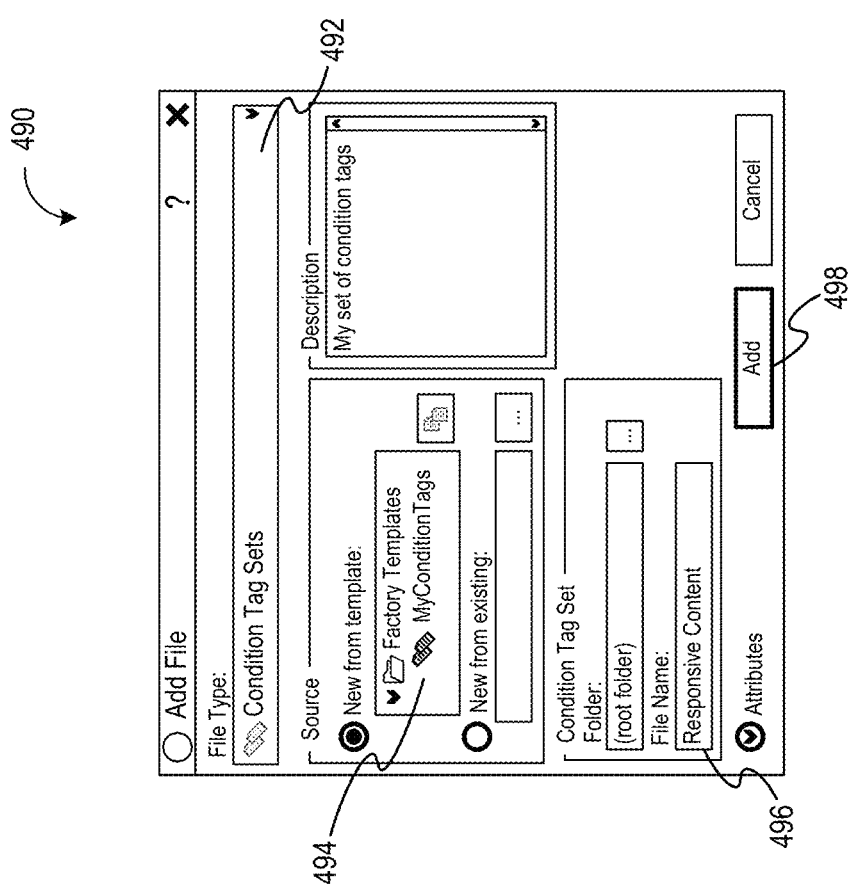
Figure 4C:
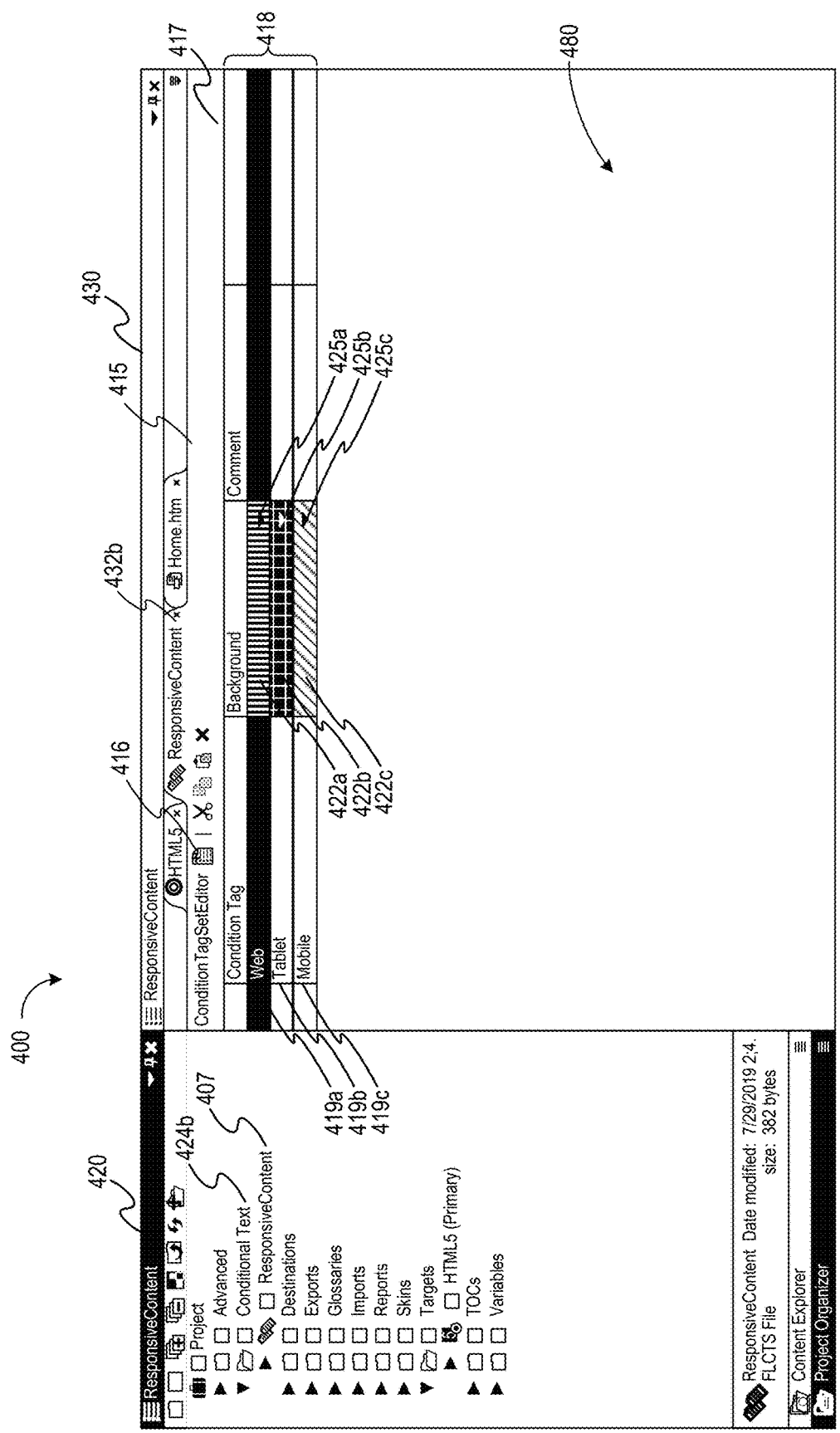

FIGS. 4A-4C illustrate screen shots of an example GUI 400 generated by an authoring and publishing system, such as the processing system 120 of FIGS. 1 and 2B for performing block 305 of FIG. 3. In various embodiments, the GUI 400 may be used for authoring and manipulating a hierarchical project, such as the hierarchical project 200 of FIG. 2A.

The GUI 400 shown in FIG. 4A graphically displays a plurality of panes 410-430 configured to facilitate creation and/or editing of components of the hierarchical project. The GUI 400 may be generated by the data display unit 226 and the display panes 228 may comprise display panes 410-430 for editing and creating the hierarchical project.

In the illustrated embodiment, upper pane 410 is configured to graphically display a ribbon toolbar 401 comprising a plurality of user interface icons for receiving input commands from the user. The ribbon toolbar 401 may permit access to and view of common input commands, for example, the ribbon toolbar 401 may graphically display one of a plurality of toolbars. In the illustrative example of FIG. 4A, ribbon toolbar 401 displays the project toolbar 402 that, among other icons, includes at least icon 405 for creating new control data files. In some embodiments, the ribbon toolbar 401 may be customized by the user and/or based on previously inputted user commands.

The left pane 420 may be configured to graphically display a content explorer pane 423 and/or a project organizer pane 421 for the hierarchical project. The content explorer pane 423 and projector organizer pane 421 may be selectively displayed through user selection via buttons 436 and 437, respectively. FIG. 4 illustrates both panes 423 and 421 simultaneously; however, in various implementations, one of panes 423 and 421 may be graphically displayed in pane 420 at a given instance.

The content explorer pane 423 visually organizes and provides access to project data of the hierarchical project. For example, the content explorer pane 423 may graphically display the project data of the hierarchical project 200 described above. The content explorer pane 423 includes a toolbar 413 along an upper portion and graphically displays a file manager or browser arrangement having various abstraction levels of folder structure for collecting and visually organizing documents that make up the hierarchical project. For example, at a first abstraction level, all content data for the hierarchical project may be collected in folder 427. At a second abstraction level, folder 427 organizes content data files into folders 428, each corresponding to a given topic (e.g., topic 202). At a next abstraction level, each folder 428 collects one or more underlying documents (e.g., document 203) that contain content for the respective topic. Each document, in various embodiments, may be a content data file in executable code format that may be executed for graphically displaying the contents therein. The content data files need not be organized in folders 428, but otherwise may be displayed standing alone, for example, as content data file 429.

The folder 431 may collect additional resources related to the content data files. For example, in the illustrated embodiment, folder 431 may be expandable to graphically display subfolders for holding content resource data files related to images and multimedia (e.g., images, videos, audio, etc.), landing pages, page layouts, style sheets, and table styles. Thus, each folder 427 collects one or more underlying documents making up the content of each topic folder 427, while each subfolder of the folder 431 collects content resources utilized by the data display unit 226 to display content. Folders may be added at various abstraction levels by selecting the add folder icon 414 from the toolbar 413 or by executing a contextual selection operation (e.g., a right click operation, voice command, gesture, similarly executed input command or shortcut keystroke, etc.) to trigger a pop-up window including options and commands overlaid on the GUI 400, where options included therein are to add, edit, or remove one or more folders.

The project organizer pane 421 visually organizes and provides access to control data of the hierarchical project. For example, the project organizer pane 421 may graphically display the control data of the hierarchical project 200 described above. The project organizer pane 421 includes a toolbar 411 along an upper portion and graphically displays a file manager or browser arrangement having various abstraction levels of folder structure for collecting and visually organizing documents that make up the hierarchical project. For example, at a first abstraction level, all control data (e.g., control data 210) for the hierarchical project may be collected in folder 408. At a second abstraction level, folder 408 organizes content data files into folders 424*a-n*, each corresponding to a given category of control data (e.g., textual formatting criteria 211, condition tags 213, skins 214, target environments 215, etc.). At a next abstraction level, each folder 424 collects one or more underlying documents (not shown) that contain information for the category of control data. Each document, in various embodiments, may be a control data file in executable code format that may be executed for controlling the graphical display of the contents data files described above for the hierarchical project 200. Thus, each folder 424 collects control data utilized by the data display unit 226 to display content and/or by the compiler 227 to build the published output file for given display environments or targets. Folders may be added at various abstraction levels by selecting the add folder icon 412 from the toolbar 411 or by executing a contextual selection operation to trigger a pop-up window including options and commands overlaid on the GUI 400, where options included therein are to add, edit, or remove one or more folders.

Center pane 430 graphically displays a multiple data file interface (MDI) pane configured with an MDI bar 481 illustratively along the upper border and a center area 480 configured to display an editor that may be one of a plurality of interfaces (sometimes referred to herein as "editors") included in the GUI. Each document interface or editor may be a user interface configured to receive inputs from a user for modifying contents of the hierarchical project. The editor displayed in center area 480 is available to receive user input, and may be overlaid on one or more other editors that, while active to facilitate quick transition there between, may not be actively receiving user input. The editor bar 481 is configured to graphically display one or more editor tabs 432*a-n*, each corresponding to active editors, with the editor currently receiving input graphically overlaid on the other active editors. In the illustrative example, there are three editor tabs 432*a*-432*c* corresponding to open target environment editor pane, condition tag editor pane, document editor pane 435, respectively, with editor tab 432c in front as it is the editor actively receiving user input and the contents of which is displayed in the center pane 430. While editors may be displayed in center pane 430, in various embodiments, an editor may be extracted from the center pane 430 and graphically displayed as a separate, floating display pane that may be placed at a user desired location.

FIG. 4A also illustrates an example document editor pane 435 for representing and manipulating (e.g., processing) the underlying structure of a hierarchical project (e.g., a markup language document), while maintaining a What You See Is What You Get (WYSIWYG) environment, as described in U.S. Pat. No. 7,934,153, the disclosure of which is incorporated by reference herein in its entirety. In the illustrated example, a WYSIWYG editor pane 435 paired with a Visual Document Structure Indicator (VDSI) pane having side bar 470 is graphically displayed to allow for both WYSIWYG and structure editing of documents in folder 427 and/or document 429 within the interface of FIG. 4. Other example editors include, but are not limited to, internal text editor for viewing and editing underlying source code of the document (e.g., an XHMTL file where the document is an XHMTL document), table of contents editor, style sheet editor, and page layout editor, etc.

In the illustrative example, center pane 430 illustrates the WYSIWYG editor pane 435 configured with center area 480, pane toolbar 455 along the upper border, and a VDSI pane comprising side bar 470 illustratively along the left border (however, the side bar 470 may be positioned elsewhere within center pane 430). In the illustrated example, the center pane 480 displays a body 434 of document 429 comprising a plurality of content elements or portions. In the illustrative example of FIG. 4A, the content elements are arranged within tables 441 and 445. For example, table 441 illustratively includes textual content elements 442 and 443 arranged as headers and an image content element 444. Table 445 includes three regions, each including executable content elements 446 and 447 and linked content elements 448a-c. In the illustrative example, executable content elements 446 and 447 are representative contextual selection operations for ingesting user input to navigate to associated linked content 448a-c, such as, a click operation element 446 or a tap operation element 447 (e.g., via a touch sensitive input). Other example contextual selection operations include, but are not limited to, voice command, gesture (e.g., a swipe), and/or similarly executed input commands or shortcut keystroke. Body 434 also includes textual content elements 450.

In the illustrated example, the side bar 470 includes elements representative of blocks of content displayed in the center area 480. In the side bar 470, the body 434 of the document is represented by element 471; a division for table 441 represented by element 473; heading blocks for textual content 442 and 443 are represented by elements 477 and 469, respectively; a heading block for content 450 is represented by element 474, and a following division for table 445 is represented by element 475. In the illustrated example, the heading element 474 is highlighted in the display to indicate that this is the block that is currently active (e.g., selected by a cursor and/or highlighted as shown in FIG. 4) as indicated by the highlighted "Click" in content 450.

One aspect of the VDSI pane is that the system is not only a visual representation of the underlying structure of the document, but also provides for element level modification of the document at this structure level. Thus, the use of the VDSI pane provides a single editor with the benefits of both a WYSIWYG editing environment and a structure-based editing environment through a single interface. Furthermore, as further described in more detail herein and in U.S. Pat. No. 7,934,153, the disclosure of which is incorporated by reference herein in its entirety, a WYSIWYG display of the document is presented in center pane 430 such that the content of which and the underlying structure are both displayed and can be directly manipulated and edited using the WYSIWYG editor pane 435.

While the side bar 470 is depicted on the left side of center area 480, other configurations are possible. For example, the side bar may be positioned along the top border of center area 480, or an additional side bar may be positioned along the top border to provide an additional Visual Document Structure Indicator (VDSI) pane with additional structure indicators.

To create condition tags, a control data file may be added to the project organizer pane 421, for example, by hovering over the folder 424b and executing a contextual selection operation (or by navigating the ribbon toolbar 401 to access and add file icon 405). This causes a context menu pop up window 490 (for example, as shown in FIG. 4B) from which new control data files can be requested. Pop up window 490 may be overlaid on the GUI 400 shown in FIG. 4A and/or as a standalone window. Selecting a "Condition Tag Set" option in the file type 492 causes the system to generate a control data file based on a pre-stored condition tag template 494. As such, the control data file may be provided with any desired name in field 496 and still operate as a condition tag data file. Selecting the "Add" icon 498 triggers the processing system 120 to generate a condition tag data file template. In some embodiments, the data file may have an extension that uniquely identifies the file type as a condition tag data file associated with a given editor, other control and content files may have other extensions. When a given data file is accessed by the data processing system, the data processing system may ingest the extension and open the corresponding editor pane in the MDI pane 480. For example, a condition tag data file may have the extension ".flcts" corresponding to a condition tag editor pane (see FIG. 5 for an example condition tag data file), while a content data file corresponding to a content document may have the extension ".htm" corresponding to the WYSIWYG editor pane 435 (see FIG. 7 for an example condition tag data file). Multiple condition tag data files may be separately created and organized within the folder 424b and stored in the project data storage 230.

FIG. 4C illustrates an example portion of GUI 400 with the upper pane 410 removed. FIG. 4C illustrates left pane 420 graphically displaying the project organizer pane 421 (as described above) and the center pane 430 graphically displaying an example condition tag editor pane 415 overlaid on the WYSIWYG editor pane 435. In this configuration, the condition tag editor pane 415 is actively receiving inputs and, thus, the editor tab 432b for condition tag editor pane 415 is in front of editor tab 432c. Inputs into the condition tag editor pane 415 may be used, for example, by the data manipulator 222 to generate and update a condition tag data file for storage in data storage 230.

In the left pane 420, one or more control data files (e.g., the template responsive content tag data file) may be generated for storing responsive content tags as described above and collected within folder 408 for the hierarchical project. For example, a condition tag data file template may be generated as responsive content tag data file. Condition tag data file 407 may be an example control data file as described above.

In the illustrated example, condition tag data file 407 may be a listing of tags comprising one or more tags and one or more background attributes for tagging content, each associated with a tag. Once the data file 407 is created, the condition tag editor pane 415 may be triggered and graphically displayed in center pane 430. If data file 407 is a newly generated file, then the condition tag editor pane 415 may automatically be displayed in response to creation of data file 407, while, if the data file 407 existed previously, selecting the data file 407 may open the condition tag editor pane 415. If any other editor is displayed in center pane 430, the condition tag editor pane 415 may be graphically displayed overlaid on the other editor.

The condition tag editor pane 415 includes center area 480 for graphically displaying a tag set 418 and a toolbar 417 at an upper portion, which comprises a plurality of user interface icons for receiving input commands from the user. The tag set 418 comprises one or more condition tags 419*a-b* (collectively "condition tags 419") and one or more background attributes 422*a-b* (collectively "background attributes 422") corresponding to each condition tag 419. As illustrated in FIG. 4C, the displayed tag set 418 may graphically display condition tags 419 as a list; however tags 419 may be displayed as a grid or other organized format. As illustrated in FIG. 4C, selecting the down arrow 425*a-c* (collectively "arrows 425") of a background attribute 422 causes a drop down menu to expand which graphically displays background attribute options for selecting and/or modifying background attributes for each condition tag 419.

The toolbar 417 may be utilized to create, edit, and manage tag set 418 (or underlying executable code text) and associations stored therein. For example, the toolbar 417 may include icon 416 for adding a new tag and other icons for copying, cutting, pasting, and deleting tags from the tag set 418. Clicking icon 416 generates a new entry within the tag set 418 having fields for a condition tag 419 and a background attribute 422. A tag name may be provided in the field corresponding to condition tag 419 and a background attribute selected via the arrow 425.

While the condition tags 419 may be provided with any desired name, in the illustrative example of FIG. 4C the condition tags 419*a-c* are named "Web", "Tablet", and "Mobile", respectively. These names are used for examples only and do not otherwise limit the scope of the embodiments herein, as any other name may be used as desired by the user (e.g., desktop, phone, monitor, TV, etc.). "Web" may be indicative that the condition tag 419*a* may be used to tag content for relatively large rendering viewport size (e.g., monitors used for desktop computers, laptops, TV, projectors, etc.). "Mobile" may be indicative that the condition tag 419*c* may be used to tag content for a relatively small viewport size (e.g., mobile phones, smart watches, etc.). "Tablet" may be indicative that the tag 419*b* may be used to tag content for a viewport size between the "Mobile" and "Web" (e.g., tablets, smaller laptops, etc.). Alternatively, instead of a device form factor, the condition tags may be used to tag content for display based on the size of an Internet browser used to render the content, for example by defining break points based on the width of the Internet browser in terms of pixel count, as described below in greater detail.

Figure 5:
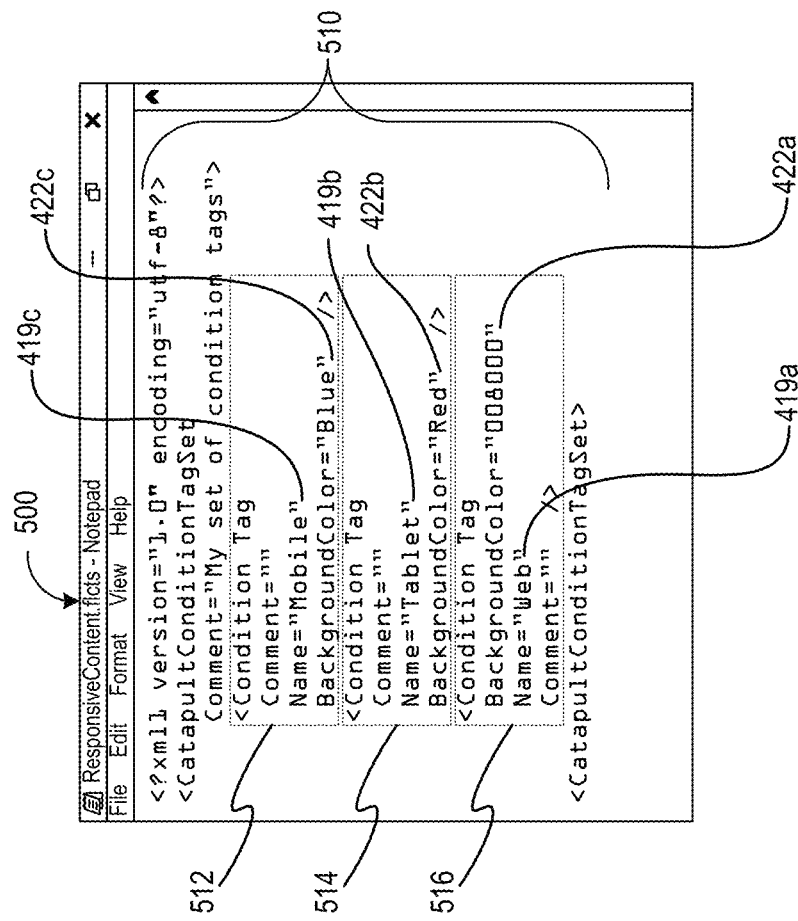
FIG. 5 illustrates an example control data file generated by the data processing system shown in FIG. 2B.

FIG. 5 illustrates an example control data file generated by the data processing system 120 shown in FIG. 2B. The control data file may be generated by the data manipulator 222 in response to user inputs and configured for storing data used in the various embodiments described herein. For example, FIG. 5 illustrates an example control data file 407 generated at block 305 of FIG. 3.

FIG. 5 illustrates an example condition tag data file 500 comprising executable code text corresponding to a tag set. The data file 500 illustrated in FIG. 5 may be an example of the data file 407 as described herein and thus the executable code text may correspond to tag set 418. It will be appreciated that data file 500 is merely an illustrative example of the format and organization of a data file that is generated by the data processing system 120. The data file 500 includes the executable code text 510 (e.g., an XHTML document) defining the tags 419 of the tag set 418 and the associated background attributes 422.

The executable code text 510 may be retrieved from project data storage 230 and executed to graphically display the condition tags 419 and background attributes 422 in condition tag editor pane 415, for example, retrieved by the data display unit 226 from project data storage 230 and displayed on display panes 228. For example, the data file 500 includes references to the condition tags, for example, as executable code text 512 representing the tag 419*c* and background attribute 422*c*, executable code text 514 representing the tag 419*b* and background attribute 422*b*, and executable code text 516 representing the tag 419*a* and background attribute 422*a*.

Figure 6A:
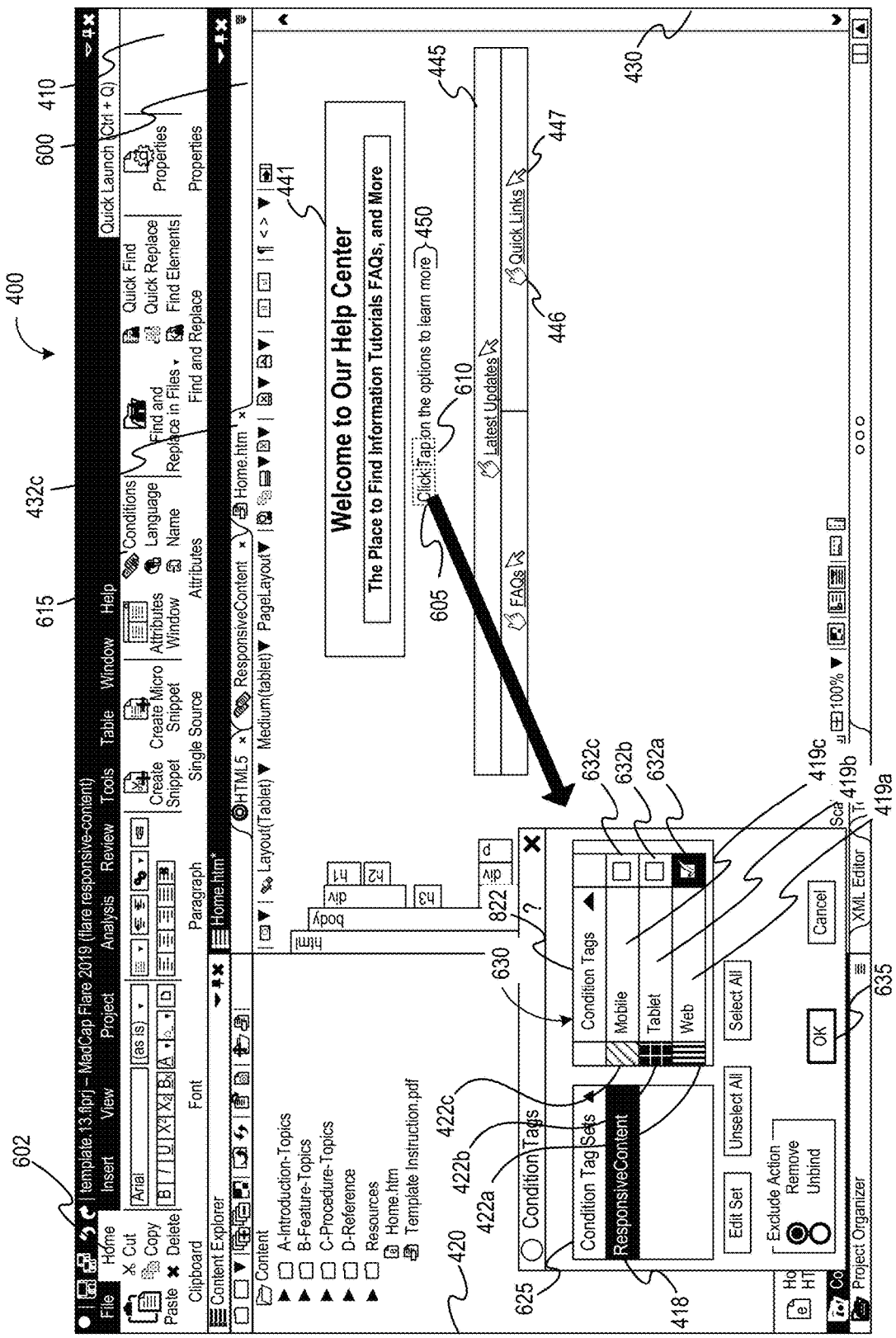
FIGS. 6A and 6B illustrate another example of the graphical user interface of FIG. 3, for designating content as responsive content according to various embodiments.
Figure 6B:
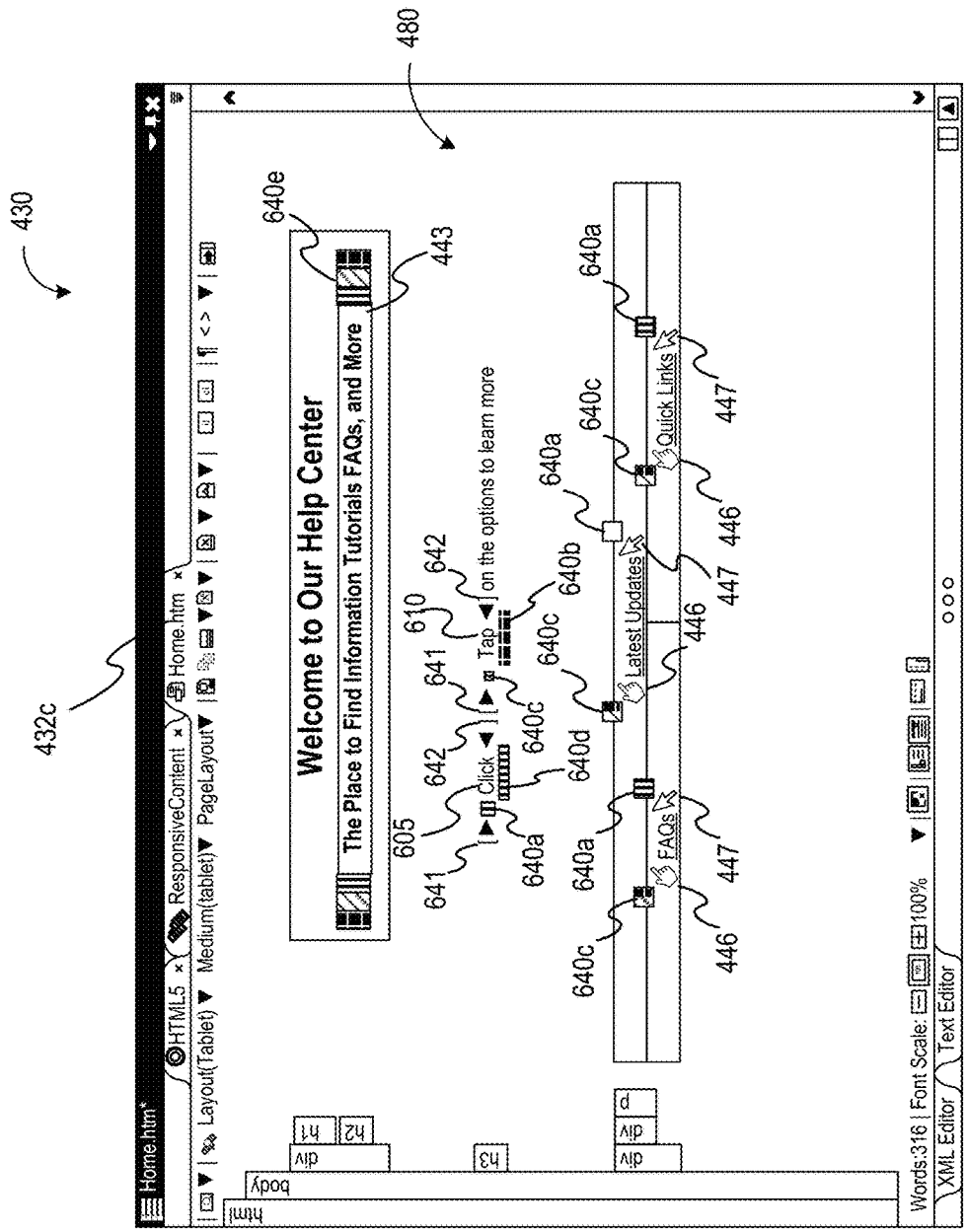

FIGS. 6A and 6B illustrate example configurations of a GUI 400 generated by an authoring and publishing system, such as the processing system 120 of FIGS. 1 and 2B for performing block 310 of FIG. 3. The configuration of FIG. 6A illustrates the content explorer pane 423 in a left pane 420, the ribbon toolbar 401 along an upper pane 410 graphically displaying a home ribbon 602, and center pane 480 graphically displaying the WYSIWYG editor pane 435 configured with a VDSI pane and side bar 470 along the left border.

The configuration of FIG. 6A may provide for selecting content from existing or recently created project data, designating the selected content as responsive content, and applying or otherwise associating the selected content with one or more condition tags, such as one or more of condition tags 419. The configuration in FIG. 6A allows for selection of the entire document and/or less than the entire document (e.g., less than all of the content therein), for example, by opening the document and selecting only a portion desired to be associated with a given condition tag or the entire body of the document. For example, one or more elements of content may be selected and condition tags applied thereto. Furthermore, one or a plurality of condition tags 419 may be applied to a single content element or portion of content. Thus, the content need only be created once and multiple tags can be applied to a common portion of content, thereby avoiding the need to duplicate content for each form factor or condition.

In the illustrated example, a document may be selected from the content explore pane 423 and corresponding content is graphically displayed in the center pane 430 via the WYSIWYG editor pane 435. That is, executable code text (e.g., the content data file) stored for the selected document is executed to graphically display the content 434 in center area 480. In the side bar 470, the various elements of the content of the body 434 is represented by the side bar elements as described above in connection to FIG. 4A.

Once the document is displayed, one or more elements of the content 434 may be selected and designated as responsive content. In the illustrated example, element 474 is highlighted indicating that at least a portion of the content element 450 is currently active (e.g., selected by a cursor and/or highlighted as shown in FIG. 6A). In the illustrative example, a first portion 605 comprises characters forming the word "Click" and a second portion 610 comprises characters forming the word "Tap", and the first portion 605 is actively selected.

Having selected the desired content, clicking on the condition icon 615 from ribbon 602 in upper pane 410 or executing a contextual selection operation on the selected content and selecting a condition option generates a dialogue pop up window, for example, a condition tag dialogue window 620. A tag set may be selected from window 625, which may include an ordered list of tag sets for the hierarchical project. In the example of FIG. 6, there is only one tag set displayed, such as tag set 418; however, any number of tag sets may be created and displayed in window 620.

Having selected the desired tag set 418, condition tags stored in the condition tag data file (e.g., condition tag data file 407) corresponding to the selected tag set are graphically displayed in window 630. In the illustrative example, where the selected tag set is tag set 418, condition tags 419 are graphically displayed as a list along with corresponding background attributes 422. The condition tags and background attributes may be displayed as a list as shown in FIG. 6B, as a grid, as dynamic expandable content, etc. The window 630 also displays check boxes 632a-c (collectively "check boxes 632") each associated with a condition tag 419 for designating which of the condition tags 419 to apply to the selected content. By selecting one or more of the check boxes 632, the condition tag 419 corresponding to the check box is applied to and otherwise associated with the selected content.

For example, the portion 605 (e.g., "Click") is selected in the WYSIWYG editor pane 435 to trigger dialogue window 620. The check box 632a is then selected corresponding to the "Web" condition tag 419a. By selecting check box 632a, the "Web" condition tag 419a is applied to and associated with the portion 605. As another example, portion 610 (e.g., "Tap") may be selected and the check boxes 632b and/or 632c selected, thereby associating the "Mobile" tag 620c and/or "Tablet" tag 620b to the portion 610. Any portion of content 434 may be selected from the WYSIWYG editor pane 435 and tagged in accordance with the above description and any number of condition tags may be applied to a selected content element.

Once the condition tags are selected, clicking on "Ok" icon 635 applies the selected condition tags to the selected content and updates the content data file to include these selections (see FIG. 7, described below). That is, the selections via user interface 224 are processed by the data manipulator 222 to update the content data file in accordance with the selections. In various embodiments, the data manipulator 222 populates the content data file with the selected conditions tags to associate the selected condition tags with the selected content elements.

FIG. 6B is another configuration of the GUI 400 of FIG. 6A with the upper pane 410 and left pane 420 removed. The configuration of FIG. 6B illustrates the center pane 480 graphically displaying the WYSIWYG editor pane 435 configured with a VDSI pane and side bar 470 along the left border after one or more condition tags applied to one or more content elements of content 434.

In the illustrated example, the WYSIWYG editor pane 435 graphically displays the content 434 as described above and tag indicators 640a-n (collectively "tag indicators 640"). Each tag indicator 640 is positioned adjacent to or overlapping with the one or more content elements associated with one or more condition tags 419. Each tag indicator 640 comprises one or more background attributes that correspond to condition tags (e.g., background attributes 422 corresponding to tags 419) applied to each selected content element. In this way, each indicator 640 is a graphical representation of a condition tag that has been applied to a portion of content 434, based on the displayed background attribute. Additionally, where an indicator corresponding to a plurality of content elements (e.g., a string of characters) brackets 641 and 642 may be displayed indicating the extent of content elements that correspond to any one indicator 640. Furthermore, each tag indicator 640 may include background attributes of one or more condition tags, thereby representing one or more condition tags applied to the content.

For example, as illustratively depicted in FIG. 6B, body 434 comprises content 450 including a "Click" content elements 605 and "Tap" content elements 610, header content elements 443 and a plurality of contextual selection operations, such as, tap operation element 447 and click operation element 446. FIG. 6B also depicts indicator 640a adjacent to the "Click" content elements 605, as represented by the brackets 641 and 642; indicator 640b adjacent to the "Tap" content elements 610; indicators 640c adjacent to the tap operation 643; and indicators 640d adjacent to the click operation 644. Indicators 640a and 640d comprise a single shading, hatches, colors, or other graphical representation that, in this example, matches background attribute 422a. Thus, indicators 640a and 640d graphically represent that the corresponding content elements are associated with the condition tag 419a. Similarly, indicators 640b and 640c include two graphical representations corresponding to background attributes 422c and 422b. Accordingly, returning to the example described above, the "Click" content element 605 and click operation 446 are associated with the "Web" tag 419a and the "Tap" content element 610 and tap operation element 447 are associated with "Mobile" tag 419c and "Tablet" tag 419b. While indicators 640d and 640b are shown as blocks under the respective content element, indicators 640d and 640b may also be shown as a highlight surrounding the respective content element.

Furthermore, FIG. 6B illustrates header content elements 443 encompassed in indicator 640e. This arrangement represents that the entire header element is associated with one or more tags corresponding to background attribute represented by the highlighting. In this example, since the highlighted region includes all three background attributes 422a-c, the header element 443 has been associated with all three tags 419a. Similar highlighting is illustratively shown encompassing the "Click" content element 605 and the "Tap" content element 610. While indicator 640e is shown as side bar blocks adjacent to the content element 443, indicator 640e may also be shown as a highlight surrounding the respective content element that is made up of each associated background attribute.

FIG. 7 illustrates an example data file generated by the data processing system 120 shown in FIG. 2B. The data files may be generated by the data manipulator 222 and configured for storing data used in the various embodiments described herein. For example, FIG. 7 illustrates an example content data file generated at block 310 of FIG. 3.

FIG. 7 illustrates an example data file 700 comprising executable code text corresponding to the selected document (e.g., a content data file corresponding to a document 203). The data file 700 illustrated in FIG. 7 is representative of any one of the content files organized in folder 427, for example document 429 in the illustrative example, and is merely an illustrative example of the format and organization of a content data file that is generated by the data processing system 120. The data file 700 includes the executable code text 710 (e.g., an XHTML document) defining the content of the document. The data file 700 may be created based on user inputs via user interface 224 to author the content and processed by the data manipulator 222 to generate the data file. When condition tags are applied, for example as shown in FIG. 6A, the data manipulator 222 updates and/or populates the content data file to include the condition tags within the file.

The executable code text 710 may be retrieved from project data storage 230 and executed to graphically display the content 434 in WYSIWYG editor pane 435, for example, retrieved by the data display unit 226 from project data storage 230 and displayed on display panes 228. For example, the data file 700 includes executable code text 720-760 representing content elements associated with tags. In more detail and with reference to FIG. 6B, data file 700 includes executable code text 721 and 722 representing "Click" content elements 605 and "Tap" content elements 610, respectively; executable code text 731, 735, 741, 745, 751, and 755 representing tap operation element 447 and click operation 446, illustratively shown as references to a resource stored in a resource data file; and executable code text 764 representing header content elements 443. Each content element is designated as responsive content as illustrated by executable code text 723, 725, 726, 729, 732, 736, 742, 746, 752, 756, and 761. Additionally, the data file 700 includes executable code text 724, 727, 728, 733, 734, 737, 743, 744, 747, 753, 754, 757, 762, and 763 representing various condition tags, such as tags 419 of tag set 418. For example, executable code text 724 is representative of condition tag 419a associated with content element 605 and executable code text 727 and 728 are representative of tags 422c and 422b, respectively, associated with content element 610.

Figure 8:
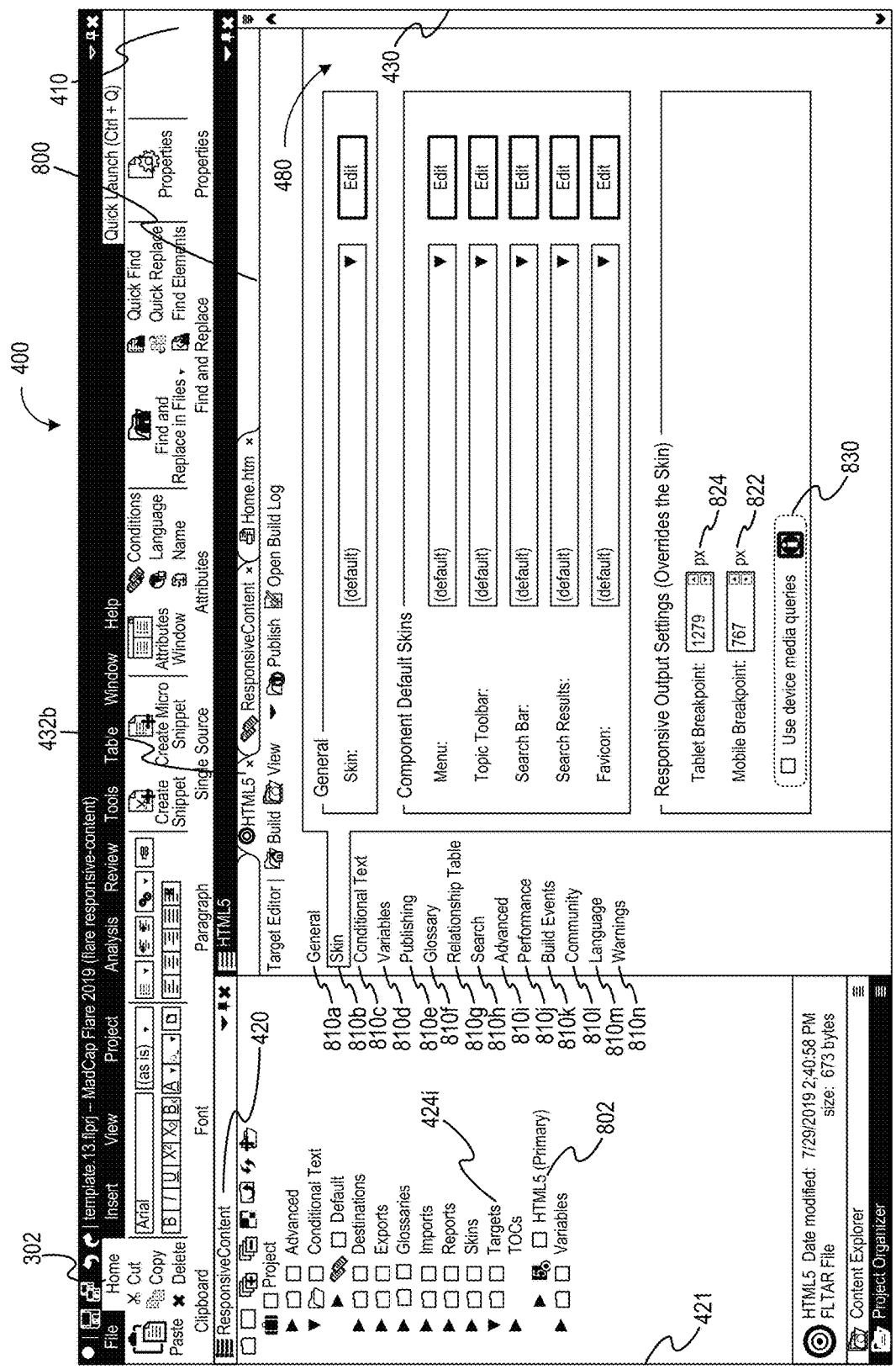
FIG. 8 illustrates another example of the graphical user interface of FIG. 3, for selecting responsive content break points according to various embodiments.

FIG. 8 illustrates another configuration of a GUI 400 generated by an authoring and publishing system for performing block 315 of FIG. 3. The configuration of FIG. 8 illustrates the project organizer pane 421 in the left pane 420 and center pane 430 graphically displaying a target environment editor pane 800 for defining display environment parameters in the center area 480. In this configuration, the target environment editor pane 800 is actively receiving inputs and, thus, the target environment editor tab 432a for target environment editor pane 800 is brought forward with respect to the other tabs 432.

In the left pane 420, the "targets" folder 424i can be expanded to graphically display and provide user access to one or more target environment data files. A target environment data file defines an engine that ingests all the data files for a hierarchical project (e.g., content, resources, and control data files), compiles the content and control data files, and publishes an output data file for the hierarchical project. Each target environment data file generates one instance of an output data file for a given display environment. For example, the target environment data file provides instructions for generating an output file for a complete singular system (that contains many topics) and is viewable on different browsers and "web friendly" devices. Each singular topic will alter its appearance and content based off of conditions rules established in the target environment data file. In the illustrative example, target environment data file 802 is provided for generating web-based output files, such as an HTML5 output files. For example with reference to FIG. 2C, the target data file may be utilized by the compiler 227 to access the project data from project data storage 230 to compile the content data of the hierarchical project by traversing the content and resource data files based on instructions contained in the control data files. The compiler 227 then builds or generates the published output file 229, for example, an HTML5 output files that comprises a plurality of data files that define properties and content of the published project. For example, the compiler 227 may traverse the content and control data files of a project and convert all of the data and mark up files to HTML/XHTML and CSS, such that that viewports that can read and render HTML/XTML and CSS can understand the instructions and display the correct text or render the desired content and formatting. When a target environment data file is accessed by the data processing system, the data processing system may ingest the extension and open the corresponding editor pane in the MDI pane 480. For example, data file 802 may have the extension ".fltar" corresponding to a target tag editor pane. Multiple target environment data files may be separately created and organized within the folder 424i and stored in the project data storage 230.

Once the target environment data file 802 is selected from the project organizer 421, the target environment editor pane 800 is triggered and populates the center area 480. The target environment editor pane 800 provides an ability to provide control information that can be applied to the hierarchical project while publishing an output file. For example, navigating through tabs 810a-n provides an ability to enter various control parameters defining the engine for producing a web-based output file.

At tab 810b, appearance parameters, also referred to as skins (e.g., a file that contains information about the appearance of an online output window, including navigation elements) can be defined. For example, from tab 810b, break points delineating between conditions can be defined. In some embodiments, break points may be based on device media queries, for example, by selecting the "Use device width media queries" check box 830. By selecting check box 830, condition break points may be based on the computing device through which the output file is viewed. Alternatively, one or more break points may be defined based on a pixel count corresponding to the width and/or height of a viewport through which the output file can be viewed, for example, a pixel count of the width and/or height of an Internet browser rendering the output file and/or the screen of the computing device. Similarly, break points may be defined based on orientation and resolution of the viewport through which the output file can be viewed In the illustrative example shown in FIG. 8, there are two break points that may be defined based on pixel count, a tablet break point 820 and a mobile break point 822. In this example, the pixel count entered for each break point 820 and 822 are the max pixel counts to correspond to that group of devices. For example, a rendering viewport having a pixel count less than or equal to the pixel count entered for break point 822 may correspond to a mobile break point, a rendering viewport having a pixel count less than or equal to the pixel count entered for break point 820 may correspond to a tablet break point, and pixel counts greater than that entered for break point 820 may correspond to a web or desktop. While only two break points are illustrated herein, it will be appreciated that more or fewer break points may be possible, for example, a third break point delineating between mobile and wearable device and/or a fourth break point delineating between a desktop monitor and a larger viewport (e.g., a big screen television, projector, etc.). Furthermore, the use of "mobile" and "tablet" are merely for illustrative purposes and are intended to limit the embodiments herein to mobile and tablet devices, but instead merely illustrate relative viewport size differences.

Figure 9:
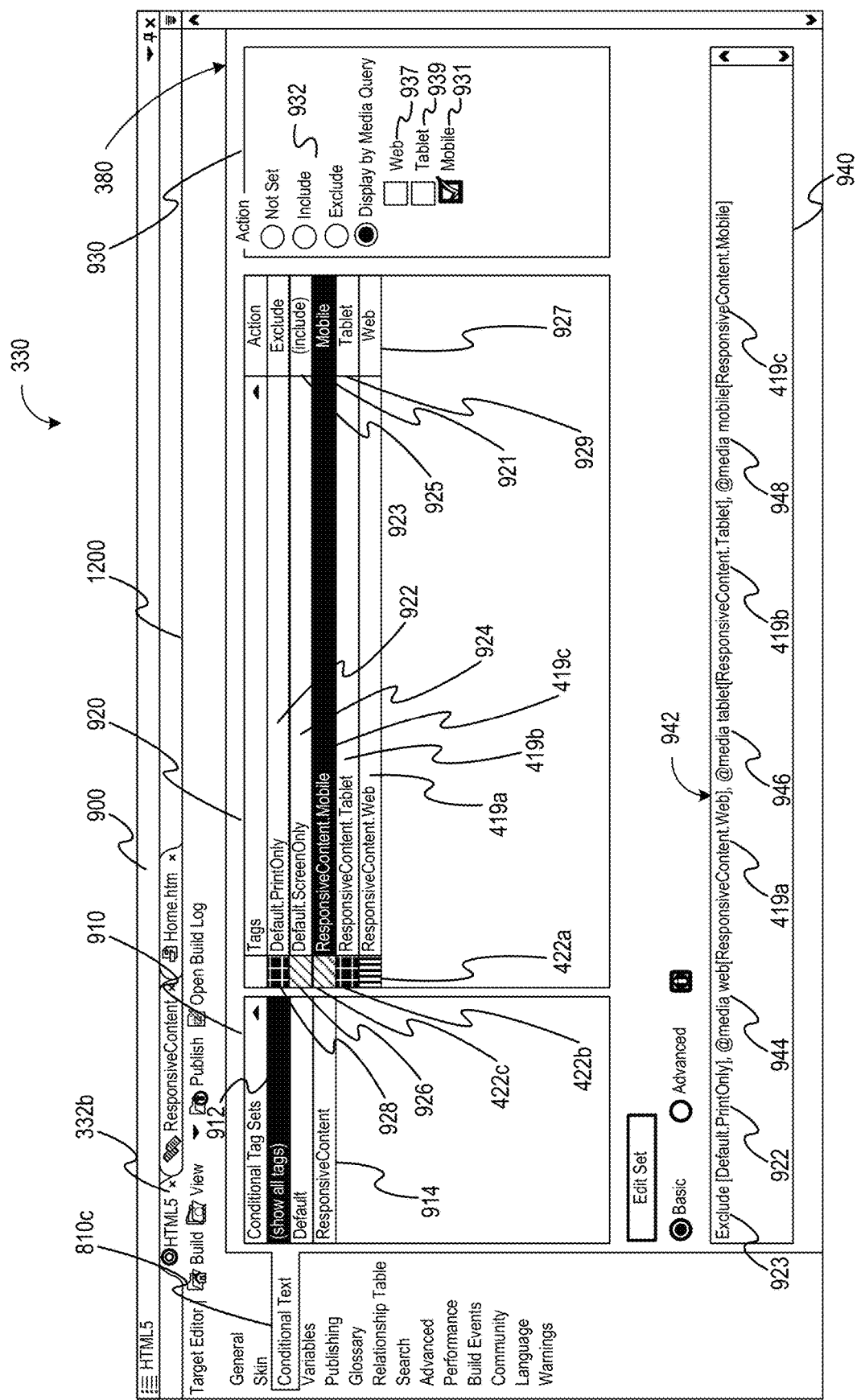
FIG. 9 illustrates another example of the graphical user interface of FIG. 3, with the upper pane and side pane removed, for designating responsive conditions according to various embodiments.

FIG. 9 illustrates another configuration of a GUI 400 generated by an authoring and publishing system for performing block 320 of FIG. 3. The configuration of FIG. 9 illustrates the target environment editor pane 800, as described above, except that tab 810c is selected instead of tab 810b as described in connection to FIG. 8. In this configuration, the target environment editor pane 800 is actively receiving inputs to designate a condition for each condition tag, and associate each condition tag with a break point.

Selecting tab 810b may trigger a conditional text interface 900 to be graphically displayed in the center area 480. The conditional text interface 900 may comprise a first window 910, a second window 920, a third window 930, and fourth window 940. The first window 910 may graphically display a listing, grid, or other organized format of presenting all of the tag sets for the hierarchical project. The second window 920 may graphically display a listing, grid, or other organized format of condition tags. The third window 930 may provide an interface for designating conditions for each condition tag. The fourth window 940 may graphically display a conditional expression generated based on the conditions designated for each condition tag, for example, by the data manipulator 222 based on inputs into the user interface 224.

In the illustrative embodiment, window 910 displays two tag sets, a first tag set 912 corresponding to all conditions for the hierarchical project and a second tag set 914, for example, corresponding to the tag set 418 described herein. Selecting the first tag set 912 may trigger all of the condition tags for the hierarchical project to be graphically displayed in the second window 920, for example, as a list, grid or other organized format. Similarly, selecting the second tag set 914 may trigger only those condition tags corresponding to the selected tag set to be displayed in window 920.

In the illustrative example of FIG. 9, the first tag set 912 is selected thus causing the second window 920 to graphically display all condition tags. In this example, the displayed condition tags include condition tags 419a-c and the corresponding background attributes 422a-c. Additionally, in this example, condition tags 922 and 924 are displayed along with corresponding background attributes 826 and 828, respectively.

Conditions (e.g. "actions") associated with each condition tag are displayed at the right side of window 920. The conditions define how content associated with each condition tag is to be handled by the compiler 227 when publishing the output file for the target environment data file 802. In the illustrative example, condition tag 922 is associated with an "exclude" condition 923; condition tag 924 is associated with an "include" condition 925. The exclude condition instructs the compiler to exclude content that is tagged with the exclude condition 923 from the output file. Thus, in this example, all content tagged as "PrintOnly" is excluded from the web-based output file. Conversely, the include condition instructs the compiler to include all content tagged with the include condition 925 (or content that is not tagged with either condition 922 or 924). Thus, in this example, all content tagged as "ScreenOnly" is included in the web-based output file. Conditions 922 and 924 may be used, for example, in adaptive web design to generate separate static output files based on desired conditions.

For responsive content, condition tags 419a-c are associated with media query rules. For example, condition tag 419a is associated with a "web" condition 927 media query, condition tag 402b is associated with a "tablet" condition 929 media query; and condition tag 419c is associated with a "mobile" condition 921 media query. Thus, all content tagged using condition tags 419a-c will be included in the output file, but will be displayed or not based on how the media query associated with each tag is resolved while rendering the tagged content.

To designate media queries for each of the condition tags, a desired condition tag may be selected. For example, as shown by the highlighting in FIG. 9, condition tag 419c is selected. This triggers the third window 930 to provide available conditions that can be assigned to the selected condition. For example, radial buttons 932 is displayed from which a condition type may be selected, for example, conditions by exclude 933, include 934, or display by media query 936. While the radial buttons 932 is an example, window 930 may be implemented in any form through which a user may designate media queries. For example, window 930 may be implemented as a drop down menu from which a selection can be made. In the depicted example, the display by media query 936 is selected. Once the condition type is selected, if applicable, available conditions will be displayed along with check boxes for selecting one or more of the conditions. Here, the check boxes 937, 939, and 931 are provided for selecting condition 927, 929, and 921, respectively. In the illustrative example, check box 931 is selected, thereby designating the mobile condition 921 for the condition tag 419c.

It will be appreciated that any single condition tag may be associated with one or more conditions as desired, for example, by selecting one or more check boxes. Furthermore, while only the three conditions described herein are illustrated, it will be appreciated that any number of conditions may be used, for example, based on the desired number of break points.

Each of the conditions may correspond to a break point as described above. For example, condition 921 may correspond to a @media.mobile break point; condition 929 may correspond to a @media.tablet break point; and condition 927 may correspond to a @media.web break point. In another example, condition 921 may correspond to a rendering viewport size that is less than or equal to break point 822 (e.g., @media.screen and (max-screen-width: XXXpx, where XXX is the value entered into break point 822); condition 927 may correspond to a rendering viewport size that is less than or equal to break point 824 and condition 929 may correspond to a rendering viewport size that is greater than break point 824.

Following the designation as described above, a conditional expression for the target environment data file is automatically generated and is based on and corresponds to condition tags and associated conditions. For example, input into user interface 224 as described above causes data manipulator 222 to automatically generate a conditional expression. In response to designating the conditions for each condition tag, the conditional expression is stored in the target environment data file 802 and, in some embodiments, can be displayed in window 940 as shown in FIG. 9. The conditional expression provides parameters that can be ingested by the compiler 227 to generate the output file.

In the example shown in FIG. 9, conditional expression 942 is generated based on the designations as described above and displayed in window 940. Conditional expression 942 comprises exclude condition 923 associated with condition tag 922 for excluding content so tagged from the output file. Conditional expression also includes media queries 944, 946, and 948 associated with condition tags 416a, 419b, and 419c, respectively.

FIG. 10 illustrates another example control data file generated by the data processing system 120 shown in FIG. 2B. The control data file may be generated by the data manipulator 222 in response to user inputs and configured for storing data used in the various embodiments described herein. For example, FIG. 10 illustrates an example target environment data file 802 generated at block 305 of FIG. 3.

FIG. 10 illustrates an example target environment data file 1000 comprising executable code text for generating an output file for a display environment. The data file 1000 illustrated in FIG. 10 may be an example of the data file 802 as described herein and thus the executable code text may define an engine for publishing a web-based output file, such as an HTML5 output file. It will be appreciated that data file 1000 is merely an illustrative example of the format and organization of a data file that is generated by the data processing system 120. The data file 1000 includes the executable code text 1010 (e.g., an XHTML document) defining the engine that ingests the data files for a hierarchical project, compiles the content and control data files, and publishes an output data file for the hierarchical project. The data file 1000 may be created based on inputs into user interface 224 and processed by the data manipulator 222 to generate the data file 1000. When the conditions are designated for condition tags, as described above in connection to FIG. 9, the data manipulator 222 updates the content data file 1000 to include the resulting conditional expression (e.g., conditional expression 942). In some embodiments, the conditional expression is updated each time a designation is made, thus when each condition tag is assigned a condition, the conditional expression is iteratively updated within the data file 1000.

In various embodiments, the compiler 227 may traverse the content and control data files of a project and convert all of the data and mark up files to HTML/XHTML and CSS using the engine defined by the target environment data file (e.g., data file 1000). The output file may be provided as a collection of data files provided in HTML/XHTML and CSS syntax, such that that a display system can read the HTML/XHTML and CSS syntax and can understand the instructions and display the correct text or render the desired content bed on the viewport characteristics. For example, content provided in XHTLM may include a tags based on compiling the project that may be executed according to the CSS to hide and/or show the tagged content in the viewport. The tags may be based, in part, on traversing and compiling the condition tags contained in a condition tag data file (e.g., data file 500) and/or in the content data file (e.g., data file 700) and based on the conditional expression included in the target environment data file (e.g., data file 1000). An example tag that may be generated and included in the XHTML for execution according to CSS may be "<MadCap:conditionalText class="mc-responsive-content-exclude-tablet mc-responsive-content-exclude-mobile" data-mc-conditions="Default.PrintOnly">. Other configurations are possible, for example, based on the conditions and tags selected during the authoring of the hierarchical project from which the output file is generated.

Figure 11A:
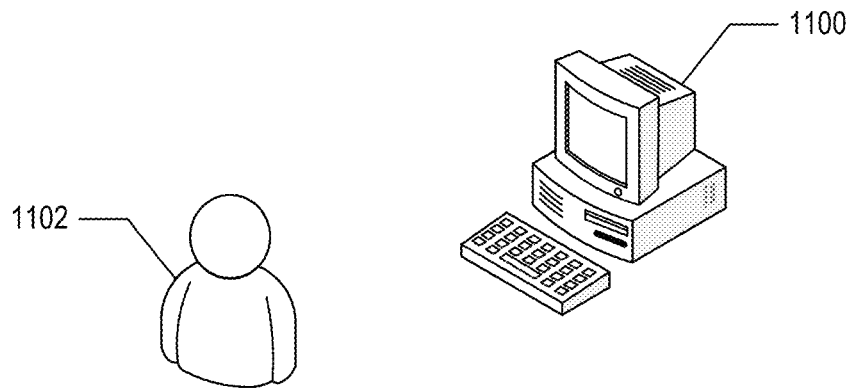
FIG. 11A shows a representation of a computer system and a user.

Various embodiments are realized in electronic hardware, computer software, or combinations of these technologies. FIG. 11A shows one representation of a computer system 1100 and a user 1102. The computer system 1100 is configured to be suitable for practicing the embodiments described herein by providing one or more data processing units or processors 1115 that execute software stored in memory 1120 that allows the user 1102 to create, edit, and maintain document content in the project environment while providing access to document structure and control information. In one example, the computer system 1100 provides one or more processors 1115 that include the various editor panes alone and/or paired with the WYSIWYG editor pane, as described in connection to FIGS. 4A-10, to provide for creating responsive content.

Figure 11B:
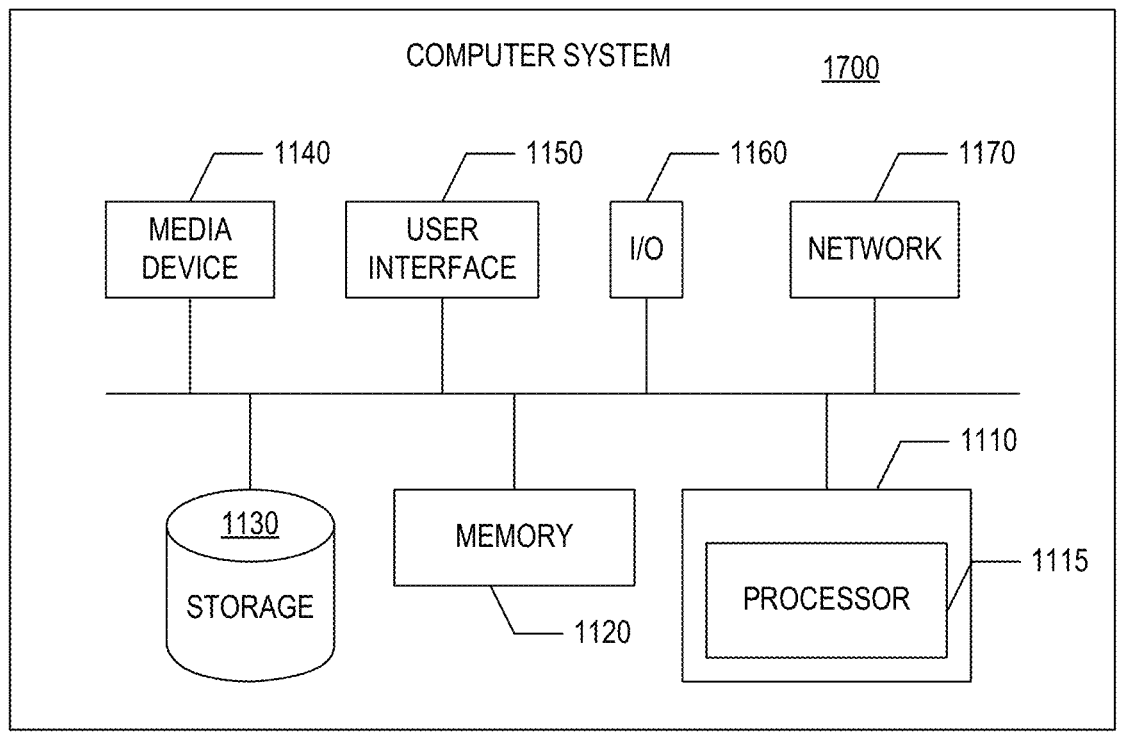
FIG. 11B shows a block diagram of one embodiment of the computer system in FIG. 11A, including an integrated document editor.

FIG. 11B shows a block diagram of one embodiment of the computer system 1100 in FIG. 11A, including the one or more processors 1115. The computer system 1100 includes a controller 1110, a memory 1120, storage 1130, a media device 1140, a user interface 1150, an input/output (I/O) interface 1160, and a network interface 1170. These components are interconnected by a common bus 1180. Alternatively, different connection configurations can be used, such as a star pattern with the controller at the center.

The controller 1110 is a programmable processor and controls the operation of the computer system 1100 and its components. The controller 1110 loads instructions from the memory 1120 or an embedded controller memory (not shown) and executes these instructions to control the system. In its execution, the controller 1110 provides an integrated document editor as a software system. Alternatively, this service can be implemented as separate components in the controller 1110 or the computer system 1100. The one or more processors 1115 include the condition tag editor pane and target environment editor pane implemented to create responsive content. The one or more processors 1115 may also include these editor panes paired with the WYSIWYG editor pane comprising the VDSI pane to allow for both structure editing and content editing within a single interface.

Memory 1120 stores data temporarily for use by the other components of the computer system 1100, such as for storing document and structure information. In some embodiments, the memory 1120 may store instructions for processing documents and/or the hierarchical project as described herein in connection to FIGS. 1-15. For example, the instructions (sometimes referred to as software programmed into the memory that can be executed by the controller 1110) may include condition tags applied to content, designations of conditions for each condition tag, and compiling documents and/or hierarchical project data as described in connection with FIGS. 1 and 3-10. In one embodiment, memory 1120 is implemented as RAM. In one embodiment, memory 1120 also includes long-term or permanent memory, such as flash memory and/or ROM.

Storage 1130 stores data temporarily or long term for use by the other components of the computer system 1100. In one embodiment, storage 1130 is a hard disk drive. Storage 1130 stores information for use by one or more processors 1115, such as content data (e.g., content data files) or structure document information (e.g., control data files), including phrases, micro content, and associations there between. Storage 1130 also stores data generated by one or more processors 1115.

The media device 1140 receives removable media and reads and/or writes data to the inserted media. In one embodiment, the media device 1140 is an optical disc drive.

The user interface 1150 includes components for accepting user input from a user of the computer system 1100 and presenting information to the user. In one embodiment, the user interface 1150 includes a keyboard, a mouse, audio speakers, and a display. The controller 1110 uses input from the user to adjust the operation of the computer system 1100.

The I/O interface 1160 includes one or more I/O ports to connect to corresponding I/O devices, such as external storage or supplemental devices (e.g., a printer or a PDA). In one embodiment, the ports of the I/O interface 1160 include ports such as: USB ports, PCMCIA ports, serial ports, and/or parallel ports. In another embodiment, the I/O interface 1160 includes a wireless interface for communication with external devices wirelessly.

The network interface 1170 includes a wired and/or wireless network connection, such as an RJ-45 or "Wi-Fi" interface (802.11) supporting an Ethernet connection.

The computer system 1100 includes additional hardware and software typical of computer systems (e.g., power, cooling, operating system), though these components are not specifically shown in FIG. 11B for simplicity. In other embodiments, different configurations of the computer system can be used (e.g., different bus or storage configurations or a multi-processor configuration).

The steps of a method or algorithm or the functions of a module, unit or block described in connection with the embodiments disclosed herein can be embodied directly in hardware, in a software module executed by a processor, or in a combination of the two. Furthermore, those of skill in the art will appreciate that the various illustrative logical blocks, modules, units, and method steps described in connection with the above described figures and the embodiments disclosed herein can often be implemented as electronic hardware, computer software, or combinations of both. To clearly illustrate this interchangeability of hardware and software, various illustrative components, blocks, modules, units, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, unit or step is for ease of description. Specific functions or steps can be moved from one module, block or unit to another without departing from the invention.

While various embodiments have been described above, it should be understood that they have been presented by way of example only, and not of limitation. The breadth and scope should not be limited by any of the above-described example embodiments. Where this document refers to technologies that would be apparent or known to one of ordinary skill in the art, such technologies encompass those apparent or known to the skilled artisan now or at any time in the future. In addition, the described embodiments are not restricted to the illustrated example architectures or configurations, but the desired features can be implemented using a variety of alternative architectures and configurations. As will become apparent to one of ordinary skill in the art after reading this document, the illustrated embodiments and their various alternatives can be implemented without confinement to the illustrated example. One of ordinary skill in the art would also understand how alternative functional, logical or physical partitioning and configurations could be utilized to implement the desired features of the described embodiments.

Furthermore, although items, elements or components can be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases can be absent.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

The foregoing method descriptions and the process flow diagrams are provided merely as illustrative examples and are not intended to require or imply that the operations of the various embodiments must be performed in the order presented. As will be appreciated by one of skill in the art, the order of operations in the foregoing embodiments may be performed in any order. Words such as "thereafter," "then," "next," etc., are not intended to limit the order of the operations; these words are simply used to guide the reader through the description of the methods. Further, any reference to claim elements in the singular, for example, using the articles "a," "an," or "the" is not to be construed as limiting the element to the singular.

Various illustrative embodiments have been described. However, one of ordinary skill in the art will see that additional embodiments are also possible and within the scope of those embodiments. Accordingly, the present invention is not limited to only those embodiments described above.

What is claimed is:

1. A method for controlling display of content in web-based documents based on a characteristic of a viewport used to render that content, the method comprising:
  generating first control data comprising at least a plurality of tags and storing the first control data in a first control data file;
  generating a graphical user interface (GUI);
  updating a content data file to include the plurality of tags in association with a portion of content data included in the content data file according to first user input received via the GUI;
  generating a conditional expression designating one or more media queries for each of the plurality of tags according to second user input received via the GUI; and
  updating a second control data file to include the conditional expression, the second control data file comprising second control data for generating an output file based on the content data file and a plurality of control data files including at least the first control data file and the second control data file,
  wherein when the output file is rendered by a computing device, the portion of the content data is displayed based on the computing device resolving the one or more media queries.

2. The method of claim 1, wherein the content data file and the plurality of control data files are each provided in executable code format.

3. The method of claim 2, wherein the second control data file corresponds to a display environment and comprises executable code for an engine configured to ingest the content data file, compile the content data and the control data files, and build the output file for the display environment.

4. The method of claim 3, wherein the display environment is an Internet browser and the published output file is a web-based output file.

5. The method of claim 2, wherein the one or more media queries are cascading style sheet (CSS) media queries for each of the one or more tags.

6. The method of claim 2, wherein the first control data file comprises a plurality of references for the plurality of tags, the method further comprising accessing the first control data file and populating the content data file with the plurality references from the second control data file, in response to the first user input.

7. A method for controlling display of content in web-based documents based on a characteristic of a viewport used to render that content, the method comprising:
  storing a document as a data file comprising content data and storing control data for generating an output file as one or more control data files;
  generating a graphical user interface (GUI);
  receiving, via the GUI, first user input selecting at least a portion of the content data;
  applying one or more tags to the selected at least a portion of the content data according to second user input;
  updating the data file by populating the data file with the one or more tags in association with the at least a portion of the content data contained in the data file;
  designating one or more media queries for each of the one or more tags according to third user input received via the GUI, each media query responsive to one or more viewport characteristics; and
  generating the control data based, in part, on said designation, the control data comprising each of the one or more tags in association with the respectively designated one or more media queries,
  wherein, when the output file is rendered on a viewport, the at least a portion of the content data is displayed responsive to the one or more media queries corresponding thereto based on the one or more tags.

8. The method of claim 7, wherein the content data comprises a plurality of character strings, and the one or more tags are applied to a single character of at least on of the character stings.

9. The method of claim 7, wherein the one or more tags comprises a plurality of tags, wherein the plurality of tags are each applied to the at least a portion of the content data.

10. The method of claim 7, further comprising:
  displaying content of the document in a first display pane of the GUI based on executing the content data,
  wherein the first user input selecting the at least a portion of the content data is received from a portion of the displayed content, and
  wherein the method further comprises generating indicators and displaying the indictors adjacent to the selected portion of the displayed content, the indicators representative of the one or more tags.

11. The method of claim 7, further comprising compiling the content data, in part, by traversing the data file based on the one or more control data files to generate the output file.

12. The method of claim 7, further comprising populating the data file with the one or more tags in association with the at least a portion of the content data contained in the data file.

13. A system for controlling display of content in web-based documents based on a characteristic of a viewport used to render that content, the system comprising:
  at least one memory configured for storing a document as a data file comprising content data and storing control data for generating an output file as one or more control data files, and
  storing instructions; and
  at least one processor coupled to the at least one memory and configured to execute the instructions to
  generate a graphical user interface (GUI),
  receive, via the GUI, first user input selecting at least a portion of the content data,
  apply one or more tags to the selected at least a portion of the content data according to second user input,
  update the data file by populating the data file with the one or more tags in association with the selected at least a portion of the content data contained in the data file,
  designate one or more media queries for each of the one or more tags according to third user input received via the GUI, each media query responsive to one or more viewport characteristics, and
  generate the control data based, in part, on said designation, the control data comprising each of the one or more tags in association with the respectively designated one or more media queries,
  wherein, when the output file is rendered on a viewport, the at least a portion of the content data is displayed responsive to the one or more media queries corresponding thereto based on the one or more tags.

14. The system of claim 13, wherein the content data comprises a plurality of character strings, and the one or more tags are applied to a single character of at least one of the character strings.

15. The system of claim 13, wherein the one or more tags comprises a plurality of tags, wherein the plurality of tags are each applied to the at least a portion of the content data.

16. The system of claim 13, wherein the at least one processor is further configured to display the GUI, the GUI comprising one or more display panes and operating to display the data file in a first display pane and receive user inputs.

17. The system of claim 16, wherein the at least one processor is configured to display content of the document in the first display pane based on executing the content data stored in the at least one memory, and the at least a portion of the content data being a portion of the displayed content selected according to user input in the first display pane, wherein the at least one processor is further configured to display indicators adjacent to the selected portion of the displayed content, the indicators representative of the one or more tags.

18. The system of claim 17, wherein each of the one or more tags are associated with a background attribute, wherein the indicators comprise the background attributes corresponding to the one or more tags applied to the at least a portion of content.

19. The system of claim 17, wherein the at least one processor is configured to display a popup window in response to the first user input selecting the displayed content, and apply the one or more tags to the selected portion of the displayed content according to user input in the popup window.

20. The system of claim 16, wherein the at least one processor is configured to graphically display a control data file in the first display pane, the control data file corresponding to a target display environment for rendering the output file, and the one or more media queries for each of the one or more tags are selected according to user input in the first display pane.

21. The system of claim 13, wherein the at least one processor is further configured to compile the content data, in part, by traversing the data file based on the one or more control data files to generate the output file.

22. The system of claim 13, wherein the one or more control data files comprise a tag data file including a plurality of tags, the plurality of tags comprising the one or more tags.

23. The system of claim 13, wherein the output file is a web-based output file.

24. The system of claim 13, wherein the one or more media queries are cascading style sheet (CSS) media queries.

* * * * *